(12) United States Patent
Harada et al.

(10) Patent No.: US 8,325,440 B2
(45) Date of Patent: Dec. 4, 2012

(54) MAGNETIC HEAD INCLUDING A POLE LAYER AND AN ANTIREFLECTION FILM SANDWICHED BY TWO SHIELDS

(75) Inventors: Tatsuya Harada, Tokyo (JP); Koichi Otani, Tokyo (JP); Hidetaka Kawano, Tokyo (JP); Kenji Yokoyama, Tokyo (JP); Naoto Matono, Hong Kong (CN)

(73) Assignees: TDK Corporation, Tokyo (JP); Sae Magnetics (H.K.) Ltd., Hong Kong (CN)

( * ) Notice: Subject to any disclaimer, the term of this patent is extended or adjusted under 35 U.S.C. 154(b) by 919 days.

(21) Appl. No.: 11/727,372

(22) Filed: Mar. 26, 2007

(65) Prior Publication Data

US 2008/0239580 A1 Oct. 2, 2008

(51) Int. Cl.
- G11B 5/23 (2006.01)
- G11B 5/31 (2006.01)
- G11B 5/11 (2006.01)
- H04R 31/00 (2006.01)

(52) U.S. Cl. .............................. 360/119.03; 29/603.14

(58) Field of Classification Search .......... 360/119.01–119.13, 125.17, 125.22, 360/125.3; 29/603.13, 603.14
See application file for complete search history.

(56) References Cited

U.S. PATENT DOCUMENTS

| | | | |
|---|---|---|---|
| 4,569,881 A * | 2/1986 | Freese et al. | 428/213 |
| 5,472,827 A | 12/1995 | Ogawa et al. | |
| 5,472,829 A | 12/1995 | Ogawa | |
| 5,591,566 A | 1/1997 | Ogawa | |
| 6,728,065 B2 | 4/2004 | Batra et al. | |
| 6,842,308 B1 | 1/2005 | Pust et al. | |
| 6,989,963 B2 | 1/2006 | Kautzky et al. | |
| 7,126,788 B1 | 10/2006 | Liu et al. | |
| 7,126,790 B1 | 10/2006 | Liu et al. | |
| 7,468,862 B2 * | 12/2008 | Sasaki et al. | 360/125.02 |
| 7,633,714 B2 * | 12/2009 | Sasaki et al. | 360/125.3 |
| 2002/0109946 A1 * | 8/2002 | Sato et al. | 360/317 |
| 2003/0174430 A1 * | 9/2003 | Takahashi et al. | 360/75 |
| 2005/0068673 A1 * | 3/2005 | Lille | 360/126 |
| 2005/0122619 A1 * | 6/2005 | Stageberg et al. | 360/125 |

FOREIGN PATENT DOCUMENTS

| | | |
|---|---|---|
| JP | A 7-201708 | 8/1995 |
| JP | A 8-51072 | 2/1996 |
| JP | A 200-132815 | 5/2000 |
| JP | A 2006-71982 | 3/2006 |

* cited by examiner

Primary Examiner — Craig A. Renner
Assistant Examiner — Gustavo Polo
(74) Attorney, Agent, or Firm — Oliff & Berridge, PLC

(57) ABSTRACT

A magnetic head incorporates: a medium facing surface; a coil; a pole layer; first and second shields disposed to sandwich the pole layer therebetween; a first gap layer disposed between the first shield and the pole layer; a second gap layer disposed between the second shield and the pole layer; and a substrate. The first shield is located closer to the substrate than the second shield. The magnetic head further incorporates an antireflection film disposed between the first shield and the first gap layer or between the first gap layer and the pole layer. The pole layer is formed by frame plating.

13 Claims, 18 Drawing Sheets

MAGNETIC HEAD INCLUDING A POLE LAYER AND AN ANTIREFLECTION FILM SANDWICHED BY TWO SHIELDS

BACKGROUND OF THE INVENTION

1. Field of the Invention

The present invention relates to a magnetic head for perpendicular magnetic recording that is used for writing data on a recording medium by means of a perpendicular magnetic recording system and a method of manufacturing such a magnetic head, and to a head assembly and a hard disk drive each of which includes the magnetic head for perpendicular magnetic recording.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter called an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

The write head for the perpendicular magnetic recording system incorporates a coil for generating a magnetic field corresponding to data to be written on a recording medium, and a pole layer for allowing a magnetic flux corresponding to the magnetic field generated by the coil to pass therethrough and generating a write magnetic field for writing the data on the recording medium. The pole layer has an end face located in a medium facing surface, and the width of the end face defines the track width.

As magnetic heads for perpendicular magnetic recording, a magnetic head incorporating first and second shields disposed to sandwich a pole layer in between is known, as disclosed in U.S. Pat. No. 7,126,788 B1, for example. In this magnetic head, at the medium facing surface, the end face of the first shield is located backward of the end face of the pole layer along the direction of travel of the recording medium with a specific distance provided therebetween. The end face of the second shield is located forward of the end face of the pole layer along the direction of travel of the recording medium with a specific distance provided therebetween. The first and second shields have a function of preventing a magnetic flux from reaching the recording medium, the flux having been generated from the end face of the pole layer and expanding in directions except the direction orthogonal to the surface of the recording medium. The magnetic head incorporating such first and second shields makes it possible to achieve a further improvement in recording density.

In the magnetic head incorporating the first and second shields, a first gap layer is disposed between the first shield and the pole layer, and a second gap layer is disposed between the second shield and the pole layer. Each of the first and second gap layers is made of a nonmagnetic material.

Here is given a description of a method of forming the pole layer in a case in which the first shield is located closer to the substrate than the second shield. In this case, the first gap layer is formed on the first shield, the pole layer is formed on the first gap layer, the second gap layer is formed on the pole layer, and the second shield is formed on the second gap layer. The pole layer is formed by frame plating, for example. In this case, a photoresist layer is first formed on the first gap layer, and the photoresist layer is patterned by photolithography to form a frame. The frame has a groove having a shape corresponding to the shape of the pole layer to be formed. Next, a plating layer that will be the pole layer is formed in the groove of the frame by plating.

The following problem arises in the case in which the pole layer is formed on the first gap layer by frame plating as described above. When the photoresist layer is patterned by photolithography, light used for exposing the photoresist layer passes through the photoresist layer, and then further passes through the first gap layer and gets reflected off the top surface of the first shield, and returns to the photoresist layer. As a result, a standing wave is generated in the photoresist layer. Consequently, the wall surface of the frame forming the groove will be formed into an irregular surface, not a flat surface. Since the plating layer grows with a shape that reflects the shape of the wall surface of the frame forming the groove, if the wall surface has irregularities, there may occur a case in which the groove is not completely filled with the plating layer and small cavities are formed in the plating layer. In this case, the resulting pole layer will include small cavities, that is, defects. Furthermore, if the wall surface of the frame forming the groove has irregularities, great variations occur in width of the pole layer, which results in variations in track width.

OBJECT AND SUMMARY OF THE INVENTION

It is an object of the invention to provide a magnetic head for perpendicular magnetic recording that incorporates a pole layer disposed between first and second shields, free from defects and capable of defining the track width with precision, and a method of manufacturing such a magnetic head, and to a head assembly and a hard disk drive each of which incorporates the magnetic head for perpendicular magnetic recording.

A magnetic head for perpendicular magnetic recording of the invention includes: a medium facing surface that faces toward a recording medium; a coil that generates a magnetic field corresponding to data to be written on the recording medium; a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system; a first shield made of a magnetic material and having an end face located in the medium facing surface at a position backward of the end face of the pole layer along a direction of travel of the recording medium; a first gap layer made of a nonmagnetic material and having an end face located in the medium facing surface, the first gap layer being disposed between the first shield and the pole layer; a second shield made of a magnetic material and having an end face located in the medium facing surface at a position forward of the end face of the pole layer along the direction of travel of the recording medium; a second gap layer made of a nonmagnetic material and having an end face located in the medium facing surface, the second gap layer being disposed between the second shield and the pole layer; and a substrate on which the coil, the pole layer, the first and second shields, and the first and second gap layers are stacked.

In the magnetic head of the invention, the first shield is located closer to the substrate than the second shield. The magnetic head of the invention further incorporates an antireflection film having an end face located in the medium facing surface, the antireflection film being disposed between the first shield and the first gap layer or between the first gap layer and the pole layer.

Since the magnetic head of the invention incorporates the antireflection film disposed between the first shield and the first gap layer or between the first gap layer and the pole layer, it is possible to reduce the effects of a standing wave when the pole layer is formed, and it is thereby possible to implement the pole layer free from defects and capable of defining the track width with precision.

In the magnetic head of the invention, the antireflection film may have a Vickers hardness greater than that of any of the pole layer, the first and second shields, and the first and second gap layers.

In the magnetic head of the invention, in the medium facing surface, the end face of the antireflection film may protrude relative to the end face of any of the pole layer, the first and second shields, and the first and second gap layers.

In the magnetic head of the invention, the antireflection film may be made of SiC.

The magnetic head of the invention may further incorporate a heater for controlling the distance between the end face of the pole layer and the recording medium.

A head assembly of the invention incorporates: a slider including the magnetic head of the invention and disposed to face toward a recording medium; and a supporter flexibly supporting the slider.

A magnetic disk drive of the invention incorporates: a slider including the magnetic head of the invention and disposed to face toward a recording medium that is driven to rotate; and an alignment device supporting the slider and aligning the slider with respect to the recording medium.

A magnetic head for perpendicular magnetic recording manufactured through a manufacturing method of the invention includes a medium facing surface, a coil, a pole layer, first and second shields, first and second gap layers, and an antireflection film.

The manufacturing method for the magnetic head of the invention includes the steps of: forming the first shield; forming the first gap layer after the first shield is formed; forming the pole layer after the first gap layer is formed; forming the second gap layer after the pole layer is formed; forming the second shield after the second gap layer is formed; forming the coil; and forming the antireflection film between the step of forming the first shield and the step of forming the pole layer.

The step of forming the pole layer includes the steps of: forming a photoresist layer; forming a frame having a groove by patterning the photoresist layer through photolithography; and forming a plating layer that will be the pole layer in the groove of the frame by plating.

In the manufacturing method for the magnetic head of the invention, the antireflection film may have a Vickers hardness greater than that of any of the pole layer, the first and second shields, and the first and second gap layers.

The manufacturing method for the magnetic head of the invention may further include the step of forming the medium facing surface such that, in the medium facing surface, the end face of the antireflection film protrudes relative to the end face of any of the pole layer, the first and second shields, and the first and second gap layers.

In the manufacturing method for the magnetic head of the invention, the antireflection film may be made of SiC.

In the manufacturing method for the magnetic head of the invention, the step of forming the pole layer may further include the step of performing ashing on a wall surface of the frame forming the groove between the step of forming the frame and the step of forming the plating layer.

The manufacturing method for the magnetic head of the invention may further include the step of forming a heater for controlling the distance between the end face of the pole layer and the recording medium.

According to the invention, since the antireflection film is disposed between the first shield and the first gap layer or between the first gap layer and the pole layer, it is possible to reduce the effects of a standing wave when the pole layer is formed, and it is thereby possible to implement the pole layer free from defects and capable of defining the track width with precision.

According to the invention, in the medium facing surface, the end face of the antireflection film may protrude relative to the end face of any of the pole layer, the first and second shields, and the first and second gap layers. In this case, it is possible to prevent the end face of the pole layer from touching the recording medium.

Other and further objects, features and advantages of the invention will appear more fully from the following description.

DETAILED DESCRIPTION OF THE PREFERRED EMBODIMENTS

First Embodiment

Figure 1:
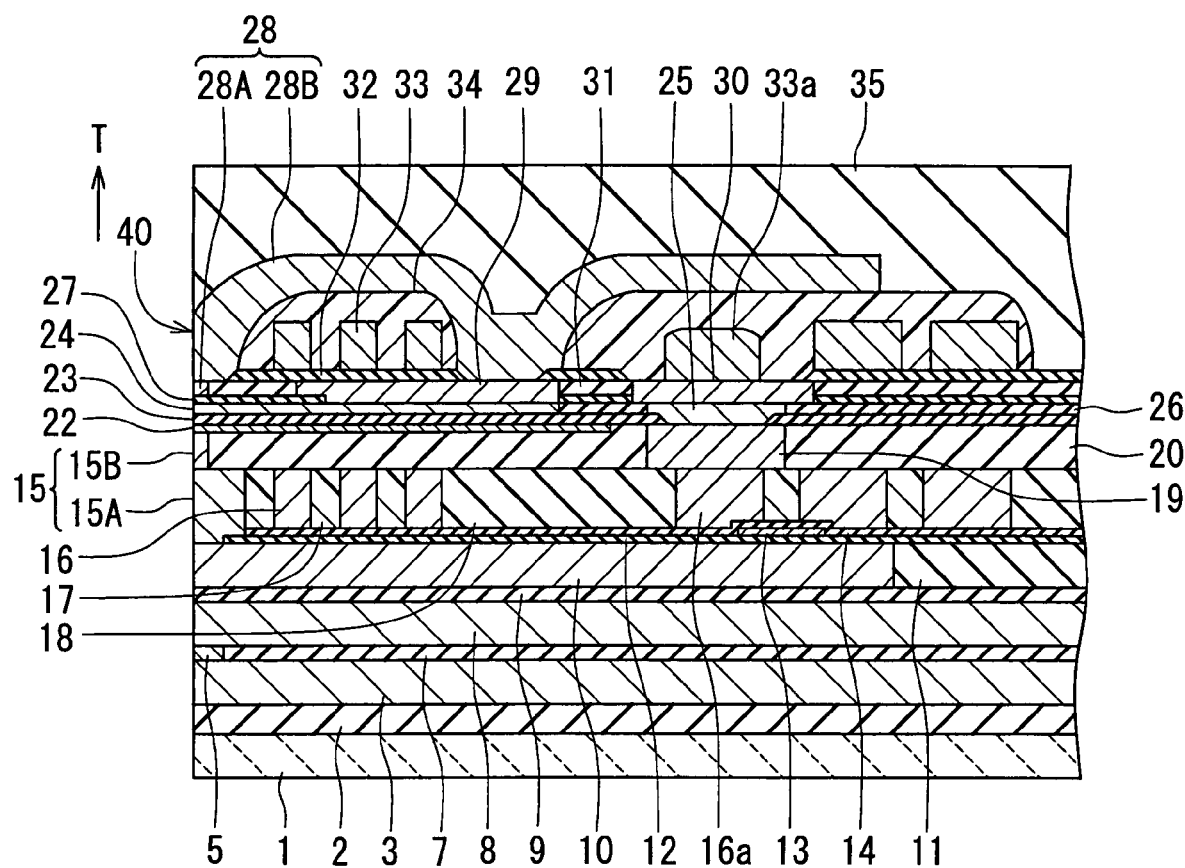
FIG. 1 is a cross-sectional view for illustrating the configuration of a magnetic head of a first embodiment of the invention.
Figure 2:
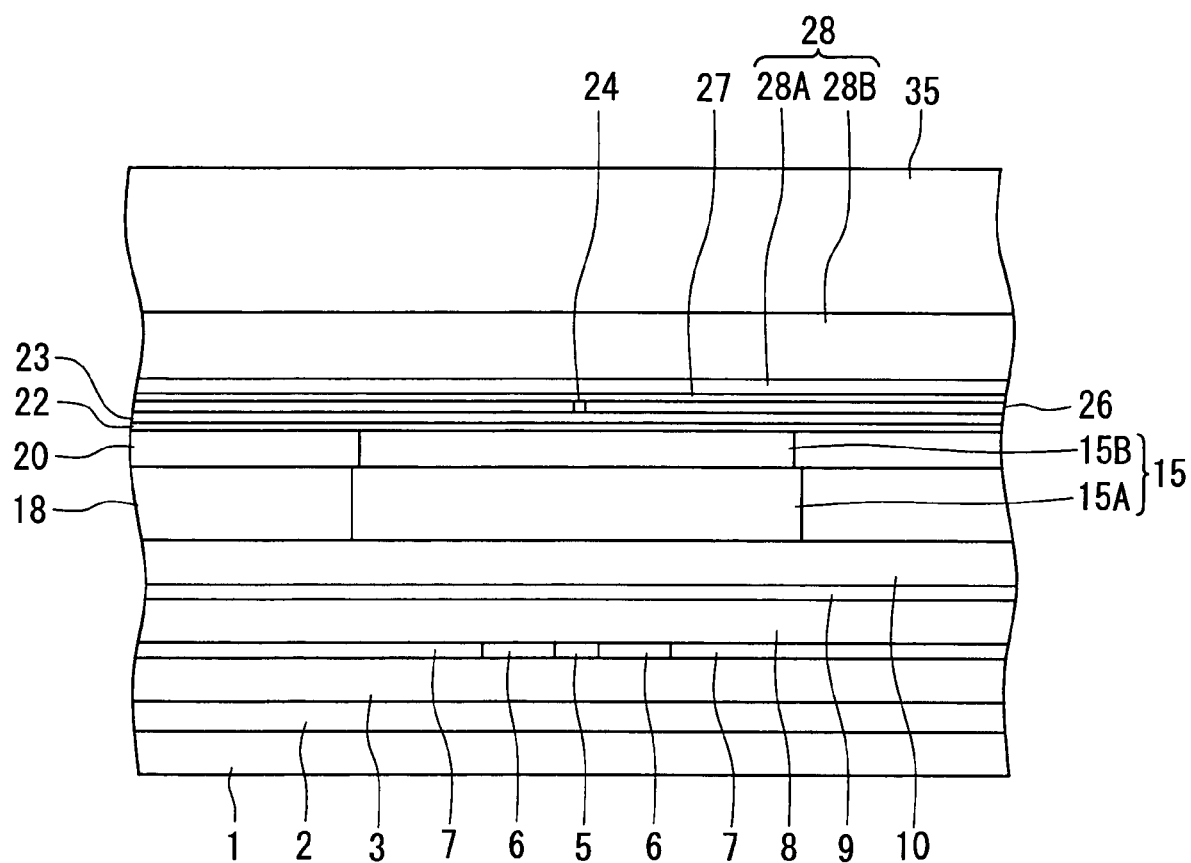
FIG. 2 is a front view of the medium facing surface of the magnetic head of the first embodiment of the invention.

Preferred embodiments of the invention will now be described in detail with reference to the accompanying drawings. Reference is now made to FIG. 1 and FIG. 2 to describe the configuration of a magnetic head for perpendicular magnetic recording (hereinafter simply called a magnetic head) of a first embodiment of the invention. Here is given an example of a magnetic head in which a TMR element utilizing a tunneling magnetoresistive effect is employed as the MR element. FIG. 1 is a cross-sectional view for illustrating the configuration of the magnetic head. FIG. 2 is a front view of the medium facing surface of the magnetic head. FIG. 1 illustrates a cross section orthogonal to the medium facing surface and the top surface of a substrate. The arrow indicated with T in FIG. 1 shows the direction of travel of a recording medium.

As shown in FIG. 1, the magnetic head of the embodiment has a medium facing surface 40 that faces toward a recording medium. As shown in FIG. 1 and FIG. 2, the magnetic head incorporates: a substrate 1 made of a ceramic such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias field applying layers 6 disposed adjacent to the two sides of the MR element 5 with respective insulating films not shown disposed in between; and an insulating layer 7 disposed around the MR element 5 and the bias field applying layers 6. The MR element 5 has an end located in the medium facing surface 40. The insulating layer 7 is made of an insulating material such as alumina. The magnetic head further incorporates: a second read shield layer 8 made of a magnetic material and disposed on the MR element 5, the bias field applying layers 6 and the insulating layer 7; and a separating layer 9 made of a nonmagnetic material such as alumina and disposed on the second read shield layer 8. The portion from the first read shield layer 3 to the second read shield layer 8 makes up a read head. Alternatively, in place of the second read shield layer 8, there may be provided a layered film made up of two magnetic layers and a nonmagnetic layer disposed between the two magnetic layers. The nonmagnetic layer is made of a nonmagnetic material such as ruthenium (Ru) or alumina.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5. The magnetic head further incorporates: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further incorporates: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described in detail later. The insulating films 12 and 14 are made of an insulating material such as alumina. An end of each of the insulating films 12 and 14 closer to the medium facing surface 40 is located at a distance from the medium facing surface 40. The end of the insulating film 14 closer to the medium facing surface 40 is located farther from the medium facing surface 40 than the end of the insulating film 12 closer to the medium facing surface 40.

The magnetic head further incorporates a first shield 15 disposed on the magnetic layer 10. The first shield 15 has: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40.

The magnetic head further incorporates: a coil 16 made of a conductive material and disposed on the insulating film 14; an insulating layer 17 with which the space between the coil 16 and the first layer 15A and the space between respective adjacent turns of the coil 16 are filled; and an insulating layer 18 disposed around the first layer 15A, the coil 16 and the insulating layer 17. The coil 16 is flat-whorl-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The magnetic head further incorporates: a connecting layer 19 made of a conductive material and disposed on the connecting portion 16a; and an insulating layer 20 made of an insulating material such as alumina and disposed around the second layer 15B and the connecting layer 19. The connecting layer 19 may be made of a material the same as that of the second layer 15B.

The magnetic head further incorporates an antireflection film 22 disposed on the second layer 15B and the insulating layer 20. The antireflection film 22 has an end face located in the medium facing surface 40. The antireflection film 22 is placed in a recessed portion formed in the top surfaces of the second layer 15B and the insulating layer 20, and does not touch the connecting layer 19. The top surfaces of the second layer 15B, the connecting layer 19, the insulating layer 20 and the antireflection film 22 are flattened. The function and material of the antireflection film 22 will be described in detail later.

The magnetic head further incorporates a first gap layer 23 disposed on the connecting layer 19, the insulating layer 20 and the antireflection film 22. The first gap layer 23 has an opening formed in a region corresponding to the top surface of the connecting layer 19. The first gap layer 23 is made of a nonmagnetic insulating material such as alumina.

The magnetic head further incorporates: a pole layer 24 made of a magnetic material and disposed on or above the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of a material the same as that of the pole layer 24. The pole layer 24, the connecting layer 25 and the insulating layer 26 have flattened top surfaces.

The magnetic head further incorporates a second gap layer 27 disposed on the pole layer 24 and the insulating layer 26. The second gap layer 27 has an opening for exposing a portion of the top surface of the pole layer 24 away from the medium facing surface 40, and an opening for exposing the top surface of the connecting layer 25. The second gap layer 27 is made of a nonmagnetic material such as alumina.

The magnetic head further incorporates a second shield 28 disposed on the second gap layer 27. The second shield 28 has: a first layer 28A disposed on the second gap layer 27; and a second layer 28B disposed on the first layer 28A. The first layer 28A and the second layer 28B are made of a magnetic material. Each of the first layer 28A and the second layer 28B has an end face located in the medium facing surface 40.

The magnetic head further incorporates: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of a material the same as that of the first layer 28A. The first layer 28A, the yoke layer 29, the connecting layer 30 and the insulating layer 31 have flattened top surfaces.

The magnetic head further incorporates an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29, the portion being located near an end of the top surface farther from the medium facing surface 40, and an opening for exposing the top surface of the connecting layer 30.

The magnetic head further incorporates a coil 33 made of a conductive material and disposed on the insulating layer 32. The coil 33 is flat-whorl-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further incorporates an insulating layer 34 disposed to cover the coil 33. The insulating layer 34 is made of photoresist, for example. The second layer 28B of the second shield 28 is disposed on the first layer 28A, the yoke layer 29 and the insulating layer 34, and connects the first layer 28A and the yoke layer 29 to each other.

The magnetic head further incorporates an overcoat layer 35 made of an insulating material such as alumina and disposed to cover the second layer 28B. The portion from the magnetic layer 10 to the second layer 28B makes up a write head.

The coil 16 is not a component requisite for the write head and may be omitted. The magnetic layer 10 and the pole layer 24 may be connected to each other at a position away from the medium facing surface 40. FIG. 1 illustrates an example in which the yoke layer 29 is disposed on the pole layer 24, that is, disposed forward of the pole layer 24 along the direction T of travel of the recording medium (that is, disposed closer to the air-outflow end of the slider). However, the yoke layer 29 may be disposed below the pole layer 24, that is, disposed backward of the pole layer 24 along the direction T of travel of the recording medium (that is, disposed closer to the air-inflow end of the slider).

As described so far, the magnetic head includes the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head incorporates the MR element 5, and the first read shield layer 3 and the second read shield layer 8 that are disposed to sandwich the MR element 5 therebetween. FIG. 1 and FIG. 2 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. In addition to the first read shield layer 3 and the second read shield layer 8, a pair of electrodes may be respectively provided on top and bottom of the MR element 5. The MR element 5 has a resistance that changes in response to an external magnetic field, that is, a signal magnetic field sent from the recording medium. It is possible to determine the resistance of the MR element 5 from the sense current. In the manner thus described, it is possible to read data stored on the recording medium through the use of the read head.

The MR element 5 is not limited to the TMR element but may be a giant-magnetoresistive (GMR) element. The GMR element may be one having a current-in-plane (CIP) structure in which the sense current is fed in a direction nearly parallel to the plane of each layer making up the GMR element, or may be one having a current-perpendicular-to-plane (CPP) structure in which the sense current is fed in a direction intersecting the plane of each layer making up the GMR element, such as the direction perpendicular to the plane of each layer making up the GMR element. In the case in which the MR element 5 is a GMR element having the CIP structure, a pair of electrodes for feeding the sense current to the MR element 5 are respectively provided on both sides of the MR element 5 taken in the width direction, and shield gap films made of an insulating material are respectively provided between the MR element 5 and the first read shield layer 3 and between the MR element 5 and the second read shield layer 8.

The write head incorporates the magnetic layer 10, the first shield 15, the coil 16, the antireflection film 22, the first gap layer 23, the pole layer 24, the second gap layer 27, the second shield 28, the yoke layer 29, and the coil 33. The first shield 15 is located closer to the substrate 1 than the second shield 28.

The coils 16 and 33 generate a magnetic field that corresponds to data to be written on the recording medium. The pole layer 24 has an end face located in the medium facing surface 40, and allows a magnetic flux corresponding to the magnetic field generated by the coils 16 and 33 to pass and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the embodiment, the first shield 15 has: the first layer 15A disposed on the magnetic layer 10; and the second layer 15B disposed on the first layer 15A. Part of the coil 16 is located on a side of the first layer 15A so as to pass through the space between the magnetic layer 10 and the pole layer 24. In the embodiment the magnetic layer 10 and the first shield 15 are not connected to the pole layer 24.

The antireflection film 22 has an end face located in the medium facing surface 40, and is disposed between the first shield 15 and the first gap layer 23. As will be described in detail later, the antireflection film 22 is provided for inhibiting reflection of light used for exposing a photoresist layer in a photolithography step performed when the pole layer 24 is formed by frame plating. The antireflection film 22 may be made of SiC or $Si_3N_4$, for example.

It is preferred that the Vickers hardness of the antireflection film 22 be greater than that of any of the pole layer 24, the first shield 15, the second shield 28, the first gap layer 23 and the second gap layer 27. Typically, each of the pole layer 24, the first shield 15 and the second shield 28 is made of a magnetic metallic material such as NiFe, CoFe, CoNiFe or CoFeN. The Vickers hardness of this magnetic metallic material is approximately 500 to 1500 $(kgf/mm^2)$. The Vickers hardness of alumina used for the first gap layer 23 and the second gap layer 27 is approximately 1800 $(kgf/mm^2)$. The Vickers hardness of SiC is approximately 2700 $(kgf/mm^2)$. Therefore, SiC is particularly preferred as the material of the antireflection film 22.

In the medium facing surface 40, the end face of the antireflection film 22 may protrude relative to the end face of any of the pole layer 24, the first shield 15, the second shield 28, the first gap layer 23 and the second gap layer 27.

In the medium facing surface 40, the end face of the first shield 15 (the end face of the second layer 15B) is located backward of the end face of the pole layer 24 along the direction T of travel of the recording medium (that is, located closer to the air-inflow end of the slider) with a specific small distance provided therebetween by the antireflection film 22 and the first gap layer 23. The distance between the end face of the pole layer 24 and the end face of the first shield 15 in the medium facing surface 40 is preferably within a range of 0.05 to 0.7 µm inclusive, and more preferably within a range of 0.1 to 0.3 µm inclusive.

The first shield 15 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the embodiment, the second shield 28 has: the first layer 28A disposed on the second gap layer 27; and the second layer 28B disposed on the first layer 28A. Part of the coil 33 is disposed to pass through the space surrounded by the pole layer 24 and the second shield 28. The second shield 28 is connected to the yoke layer 29 at a position away from the medium facing surface 40. Therefore, the second shield 28 is connected to the pole layer 24 through the yoke layer 29 at a position away from the medium facing surface 40. The pole layer 24, the second shield 28 and the yoke layer 29 form a magnetic path through which the magnetic flux corresponding to the magnetic field generated by the coil 33 passes.

In the medium facing surface 40, the end face of the second shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 0.2 µm, and more preferably within a range of 25 to 50 nm inclusive.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken in into the pole layer 24. The second shield 28 also has a function of returning a magnetic flux that has been generated from the end face of the pole layer 24 and has magnetized the recording medium.

Figure 3:
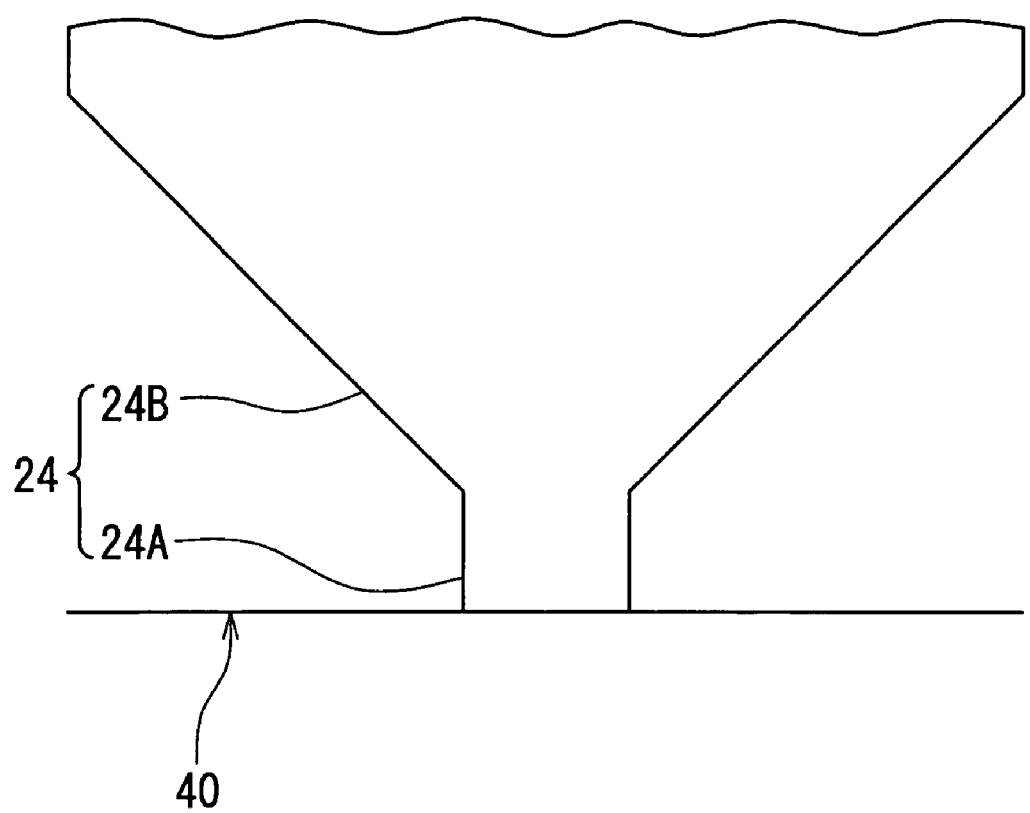
FIG. 3 is a top view of part of a pole layer of the first embodiment of the invention.

Reference is now made to FIG. 3 to describe the shape of the pole layer 24. FIG. 3 is a top view of a portion of the pole layer 24 near the medium facing surface 40. The pole layer 24 incorporates a track width defining portion 24A and a wide portion 24B. The track width defining portion 24A includes a first end located in the medium facing surface 40 and a second end located away from the medium facing surface 40, and has a width that defines track width. The wide portion 24B is coupled to the second end of the track width defining portion 24A and has a width greater than the width of the track width defining portion 24A. The width of the track width defining portion 24A is nearly uniform. The wide portion 24B is, for example, equal in width to the track width defining portion 24A at the boundary with the track width defining portion 24A, and gradually increases in width as the distance from the medium facing surface 40 increases and then maintains a specific width to the end of the wide portion 24B.

Figure 4:
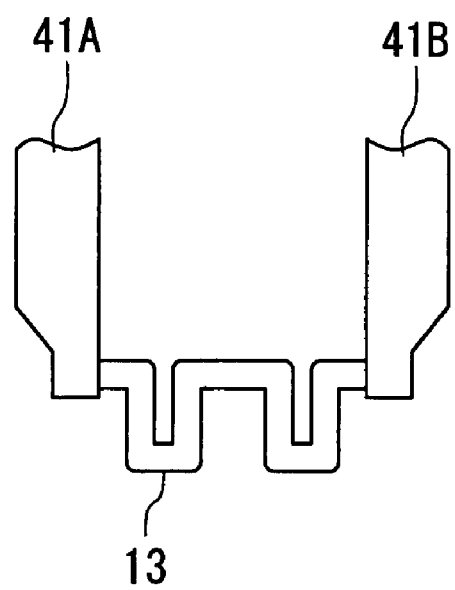
FIG. 4 is a top view of a heater of the first embodiment of the invention.

Reference is now made to FIG. 4 to describe the heater 13. The heater 13 is provided for heating the components of the write head including the pole layer 24 so as to control the distance between the recording medium and the end face of the pole layer 24 located in the medium facing surface 40. FIG. 4 illustrates an example of the shape of the heater 13. In this example, the heater 13 is meandering in shape. Leads 41A and 41B are respectively connected ends of the heater 13. The heater 13 is made of an NiCr film or a layered film made up of a Ta film, an NiCu film and a Ta film, for example. The heater 13 is energized through the leads 41A and 41B and thereby produces heat, and heats the components of the write head. As a result, the components of the write head expand and the end face of the pole layer 24 located in the medium facing surface 40 gets closer to the recording medium.

Reference is now made to FIG. 5 to FIG. 25 to describe a method of manufacturing the magnetic head of the embodiment. Each of FIG. 5 to FIG. 25 is a cross-sectional view of a layered structure obtained in the course of manufacturing process of the magnetic head. In FIG. 5 to FIG. 25 the portions from the substrate 1 to the separating layer 9 are omitted. In FIG. 5 to FIG. 25 the broken line with ABS indicates the position at which the medium facing surface 40 is to be formed.

In the method of manufacturing the magnetic head of the embodiment, for example, components of a plurality of magnetic heads are formed on a single substrate (wafer) to thereby fabricate a substructure in which pre-slider portions each of which will be a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby formed.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias field applying layers 6 and the insulating layer 7 are formed on the first read shield layer 3. Next, the second read shield layer 8 is formed on the MR element 5, the bias field applying layers 6 and the insulating layer 7. Next, the separating layer 9 is formed on the second read shield layer 8.

Figure 5:
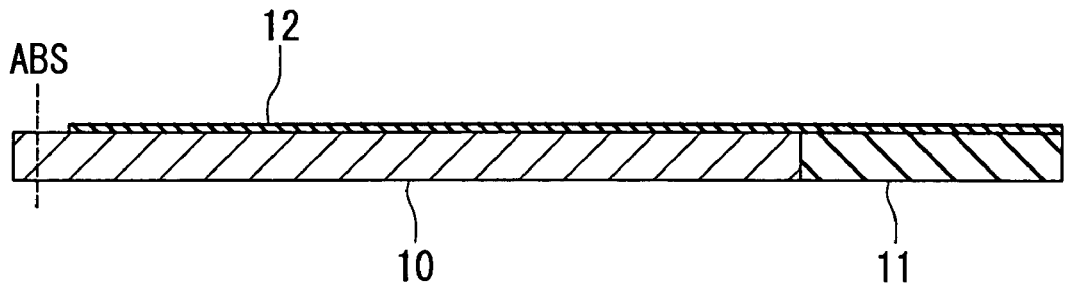
FIG. 5 is a cross-sectional view for illustrating a step of a method of manufacturing the magnetic head of the first embodiment of the invention.

FIG. 5 illustrates the following step. In the step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the insulating film 12 is formed on the magnetic layer 10 and the insulating layer 11.

Figure 6:
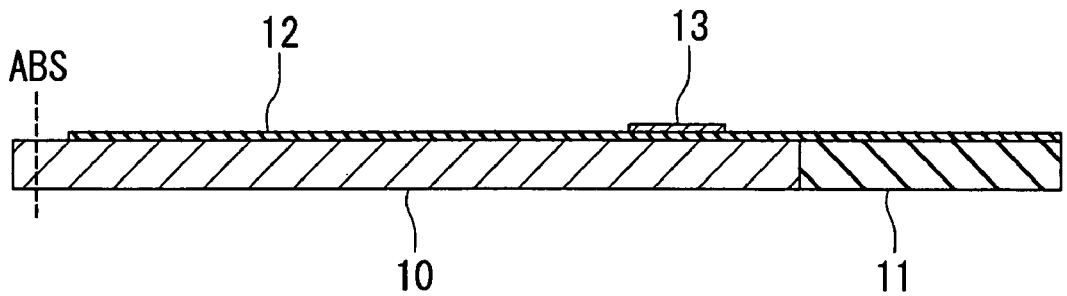
FIG. 6 is a cross-sectional view for illustrating a step that follows the step of FIG. 5.
Figure 7:
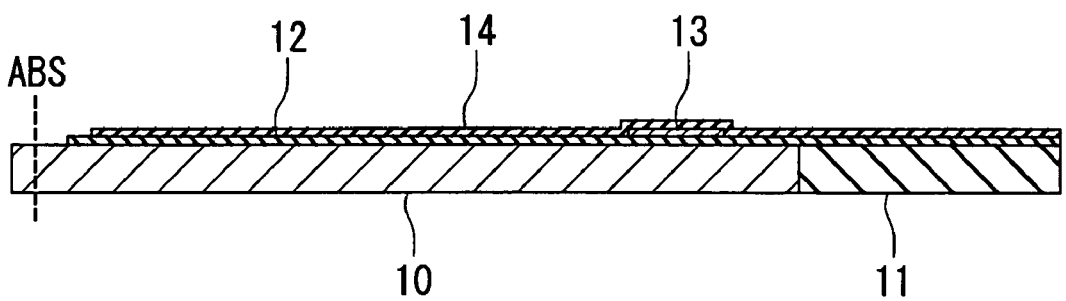
FIG. 7 is a cross-sectional view for illustrating a step that follows the step of FIG. 6.

Next, as shown in FIG. 6, the heater 13 and the leads 41A and 41B not shown are formed on the insulating film 12. Next, as shown in FIG. 7, the insulating film 14 is formed on the insulating film 12, the heater 13, and the leads 41A and 41B so as to cover the heater 13 and the leads 41A and 41B.

Figure 8:
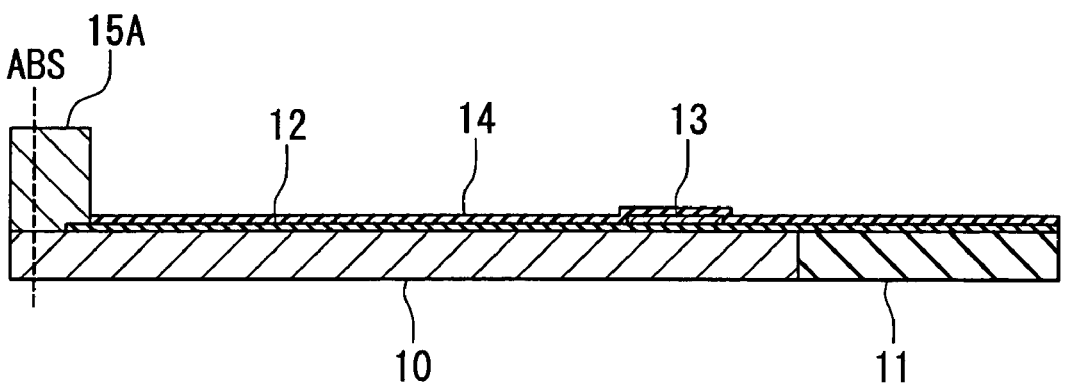
FIG. 8 is a cross-sectional view for illustrating a step that follows the step of FIG. 7. A1
Figure 9:
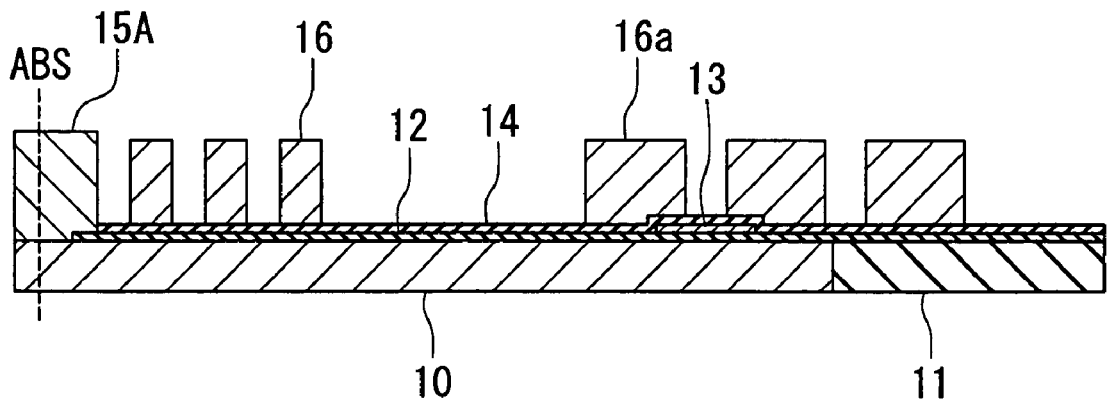
FIG. 9 is a cross-sectional view for illustrating a step that follows the step of FIG. 8.
Figure 10:
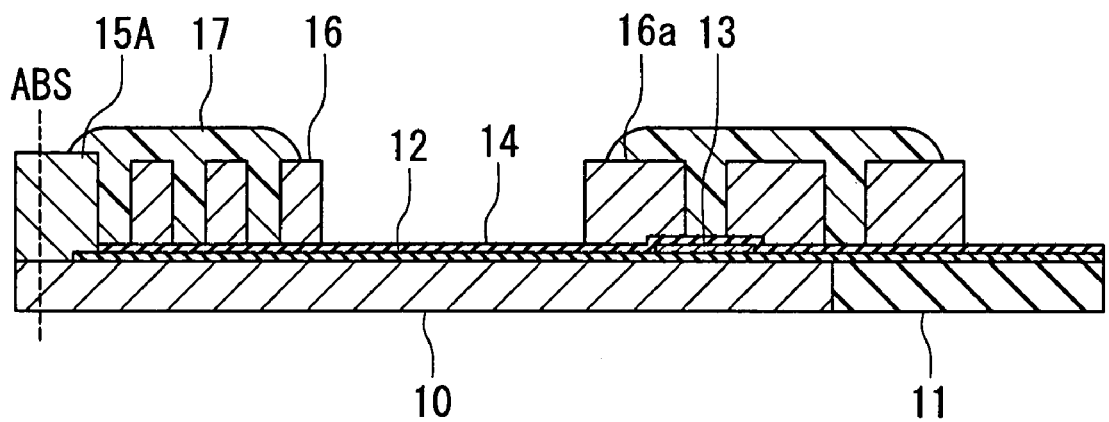
FIG. 10 is a cross-sectional view for illustrating a step that follows the step of FIG. 9.

Next, as shown in FIG. 8, the first layer 15A of the first shield 15 is formed on the magnetic layer 10 by frame plating, for example. Next, as shown in FIG. 9, the coil 16 is formed on the insulating film 14 by frame plating, for example. Next, as shown in FIG. 10, the insulating layer 17 is formed so that the space between the coil 16 and the first layer 15A and the space between the respective adjacent turns of the coil 16 are filled with the insulating layer 17.

Figure 11:
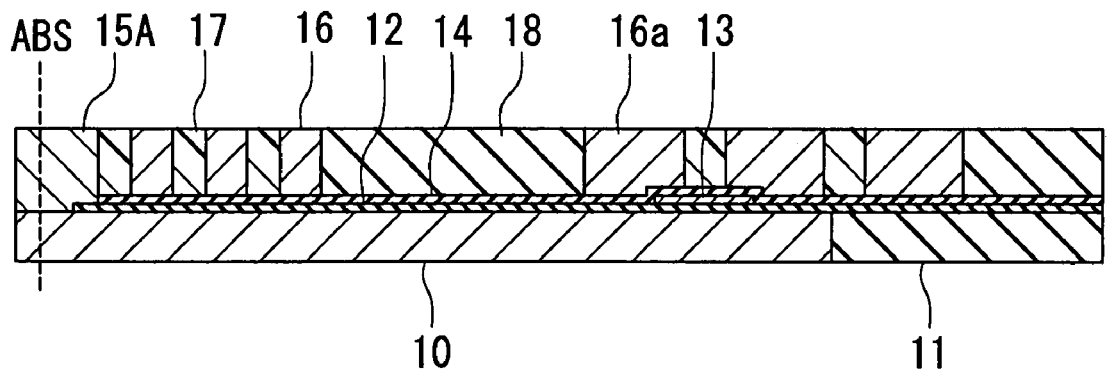
FIG. 11 is a cross-sectional view for illustrating a step that follows the step of FIG. 10.

FIG. 11 illustrates the following step. In the step, first, the insulating layer 18 is formed on the entire top surface of the layered structure of FIG. 10. Next, the insulating layer 18 is polished by CMP, for example, so that the first layer 15A and the coil 16 are exposed, and the top surfaces of the first layer 15A, the coil 16 and the insulating layer 18 are thereby flattened.

Figure 12:
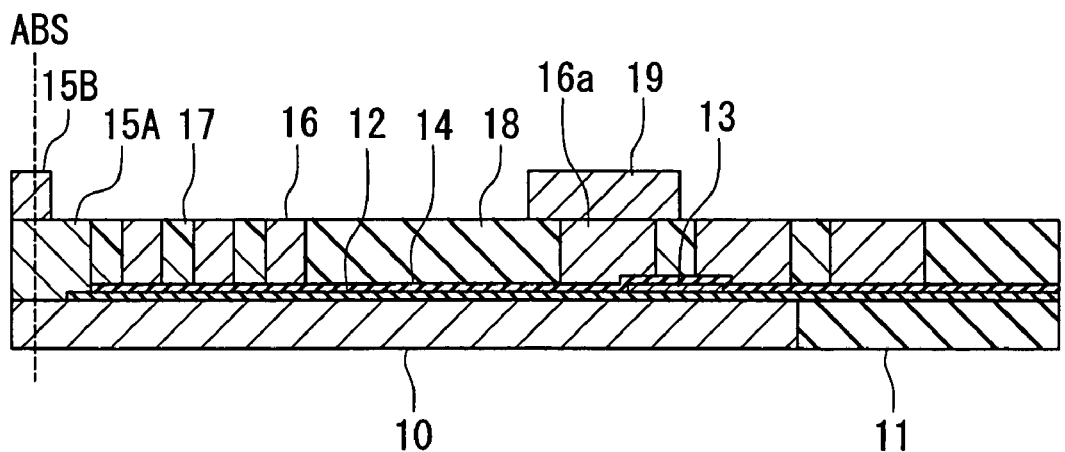
FIG. 12 is a cross-sectional view for illustrating a step that follows the step of FIG. 11. A2

Next, as shown in FIG. 12, the second layer 15B and the connecting layer 19 are formed by frame plating, for example.

Figure 13:
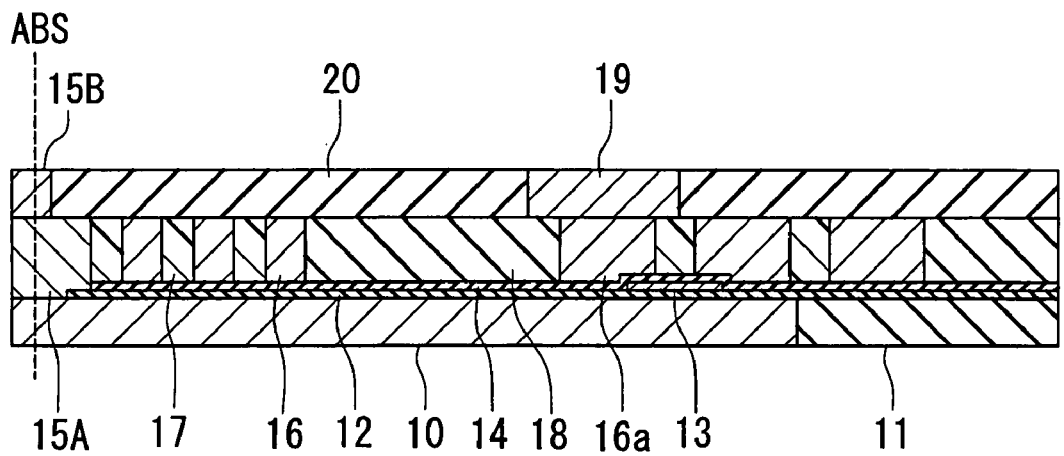
FIG. 13 is a cross-sectional view for illustrating a step that follows the step of FIG. 12.

FIG. 13 illustrates the following step. In the step, first, the insulating layer 20 is formed on the entire top surface of the layered structure of FIG. 12. Next, the insulating layer 20 is polished by CMP, for example, so that the second layer 15B and the connecting layer 19 are exposed, and the top surfaces of the second layer 15B, the connecting layer 19 and the insulating layer 20 are thereby flattened.

Figure 14:
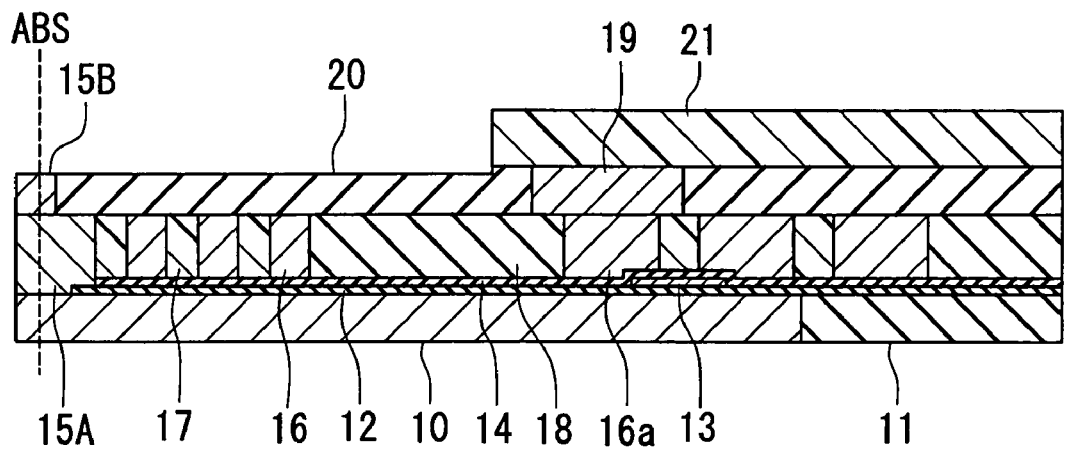
FIG. 14 is a cross-sectional view for illustrating a step that follows the step of FIG. 13.

FIG. 14 illustrates the following step. In the step, first, a photoresist layer is formed on the layered structure of FIG. 13, and the photoresist layer is patterned by photolithography to form a mask 21. The mask 21 has an opening formed in a region where the antireflection film 22 is to be disposed. Next, through the use of the mask 21, portions of the top surfaces of the second layer 15B and the insulating layer 20 are etched by ion milling, for example, to form a recessed portion in the top surfaces of the second layer 15B and the insulating layer 20. The depth of this recessed portion is equal to or nearly equal to the thickness of the antireflection film 22 to be formed.

Figure 15:
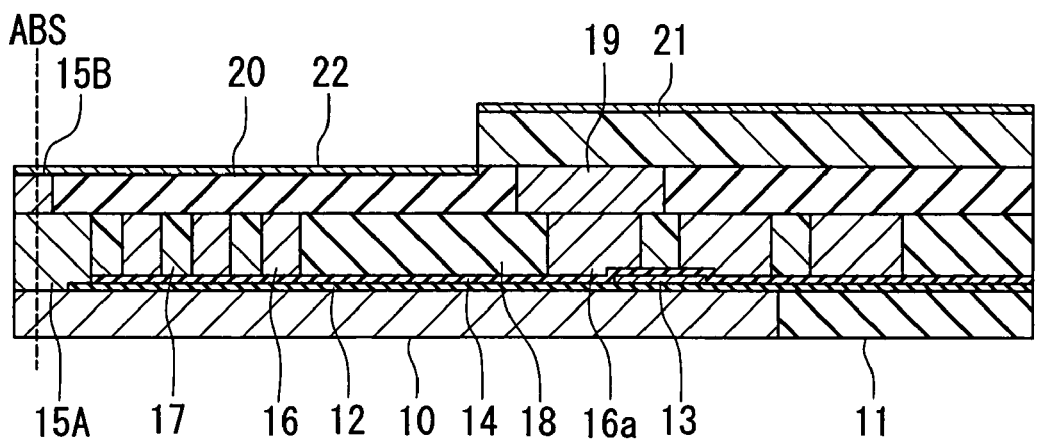
FIG. 15 is a cross-sectional view for illustrating a step that follows the step of FIG. 14.

FIG. 15 illustrates the following step. In the step, first, the antireflection film 22 is formed by sputtering, for example, on the entire top surface of the layered structure of FIG. 14. Next, the mask 21 is removed. As a result, there remains only a portion of the antireflection film 22 placed in the recessed portion formed in the top surfaces of the second layer 15B and the insulating layer 20. The top surface of the layered structure of FIG. 15 having undergone the removal of the mask 21 is flat.

Figure 16:
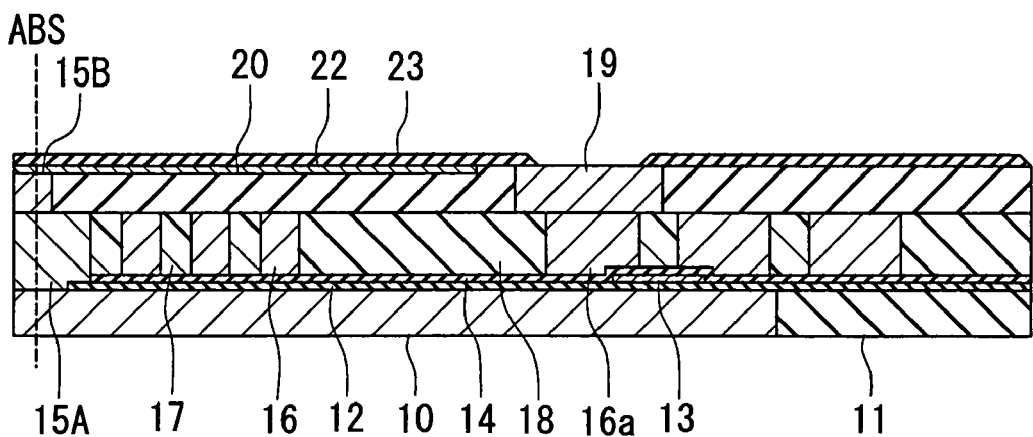
FIG. 16 is a cross-sectional view for illustrating a step that follows the step of FIG. 15.

FIG. 16 illustrates the following step. In the step, first, the first gap layer 23 is formed on the entire top surface of the layered structure of FIG. 15 having undergone the removal of the mask 21. Next, an opening is formed by ion milling, for example, in a region of the first gap layer 23 corresponding to the top surface of the connecting layer 19.

Figure 17:
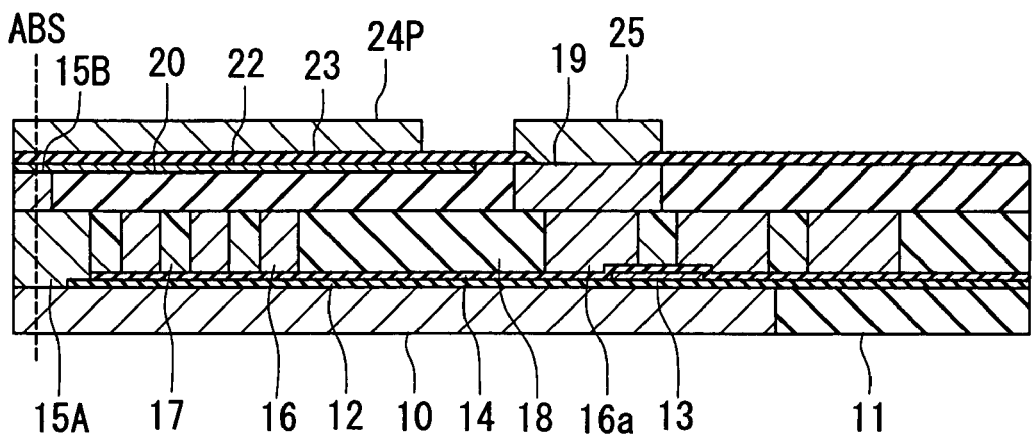
FIG. 17 is a cross-sectional view for illustrating a step that follows the step of FIG. 16.

Next, as shown in FIG. 17, a plating layer 24P that will be the pole layer 24 later and the connecting layer 25 are formed by frame plating.

Figure 18:
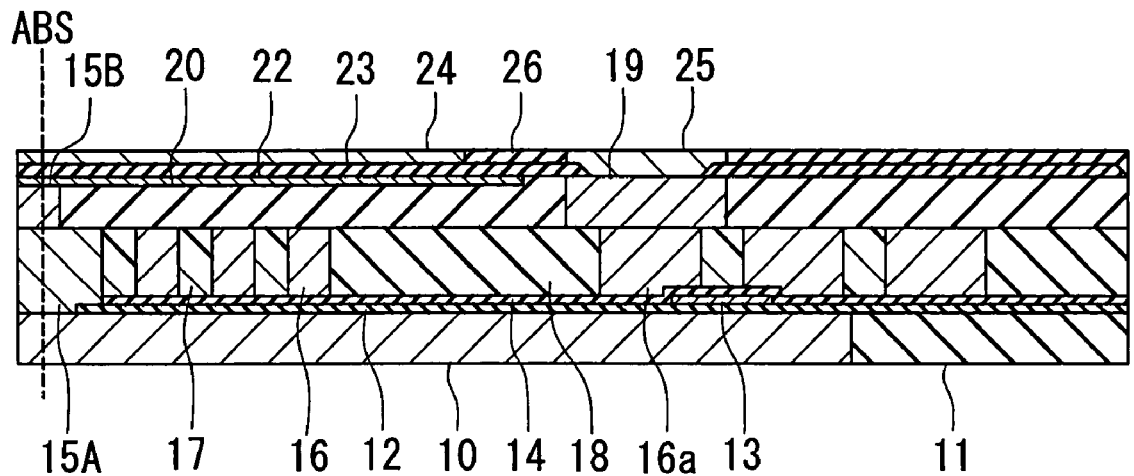
FIG. 18 is a cross-sectional view for illustrating a step that follows the step of FIG. 17.

FIG. 18 illustrates the following step. In the step, first, the insulating layer 26 is formed on the entire top surface of the layered structure of FIG. 17. Next, the insulating layer 26, the plating layer 24P and the connecting layer 25 are polished by CMP, for example, so that the plating layer 24P and the connecting layer 25 are exposed and these layers have desired thicknesses, and the top surfaces of these layers are thereby flattened. The plating layer 24P becomes the pole layer 24 by being polished to have a desired thickness. The step of forming the pole layer 24 will be described in detail later.

Figure 19:
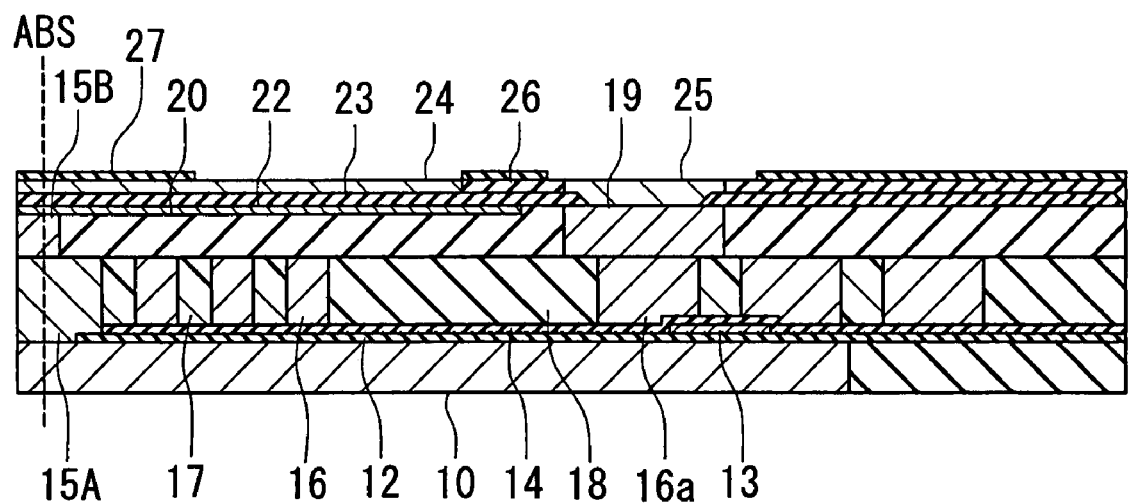
FIG. 19 is a cross-sectional view for illustrating a step that follows the step of FIG. 18.

FIG. 19 illustrates the following step. In the step, first, the second gap layer 27 is formed on the entire top surface of the layered structure of FIG. 18. Next, an opening for exposing a portion of the top surface of the pole layer 24 and an opening for exposing the top surface of the connecting layer 25 are formed by ion milling, for example, in the second gap layer 27.

Figure 20:
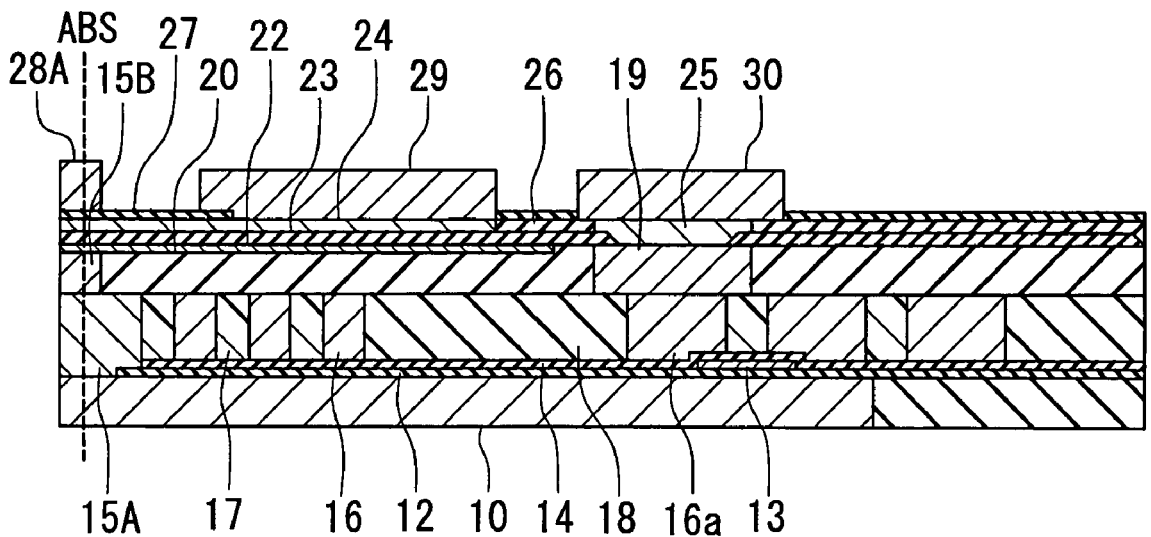
FIG. 20 is a cross-sectional view for illustrating a step that follows the step of FIG. 19.

Next, as shown in FIG. 20, the first layer 28A of the second shield 28, the yoke layer 29 and the connecting layer 30 are formed by frame plating, for example.

Figure 21:
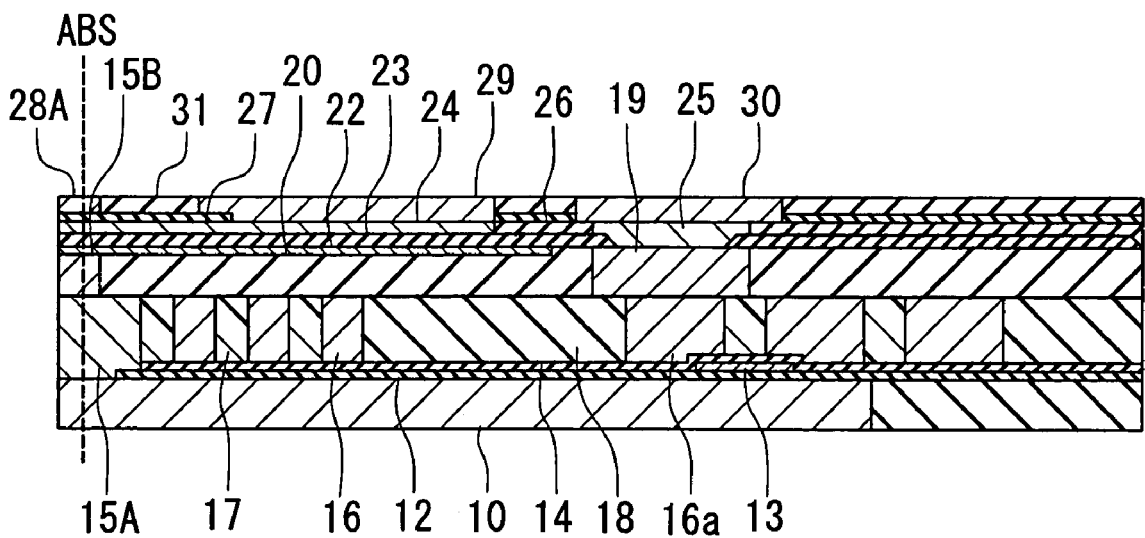
FIG. 21 is a cross-sectional view for illustrating a step that follows the step of FIG. 20.

FIG. 21 illustrates the following step. In the step, first, the insulating layer 31 is formed on the entire top surface of the layered structure of FIG. 20. Next, the insulating layer 31, the first layer 28A, the yoke layer 29 and the connecting layer 30 are polished by CMP, for example, so that the first layer 28A, the yoke layer 29 and the connecting layer 30 are exposed and these layers have desired thicknesses, and the top surfaces of these layers are thereby flattened.

Figure 22:
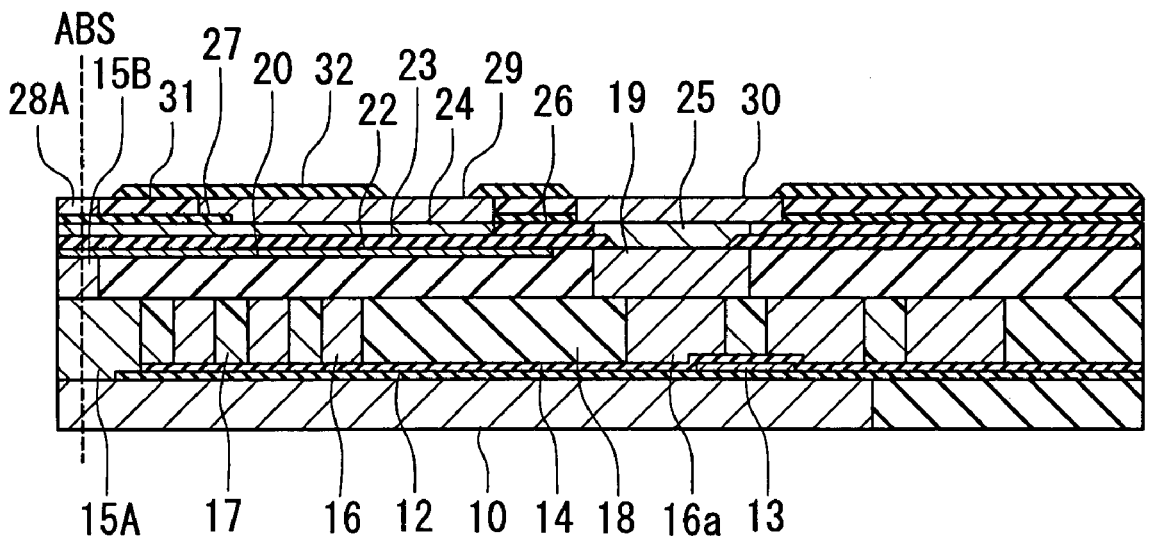
FIG. 22 is a cross-sectional view for illustrating a step that follows the step of FIG. 21.

Next, as shown in FIG. 22, the insulating layer 32 is formed on the yoke layer 29 and the insulating layer 31. The insulating layer 32 may be formed by etching a portion of an insulating film formed on the entire top surface of the layered structure of FIG. 21 by ion milling, for example, or may be formed by lift-off.

Figure 23:
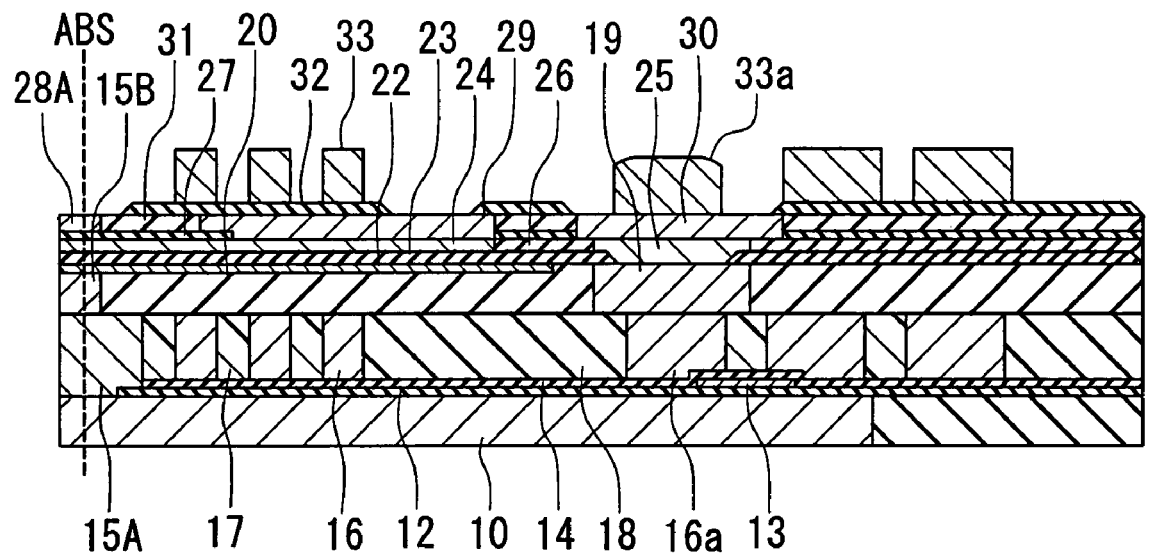
FIG. 23 is a cross-sectional view for illustrating a step that follows the step of FIG. 22.
Figure 24:
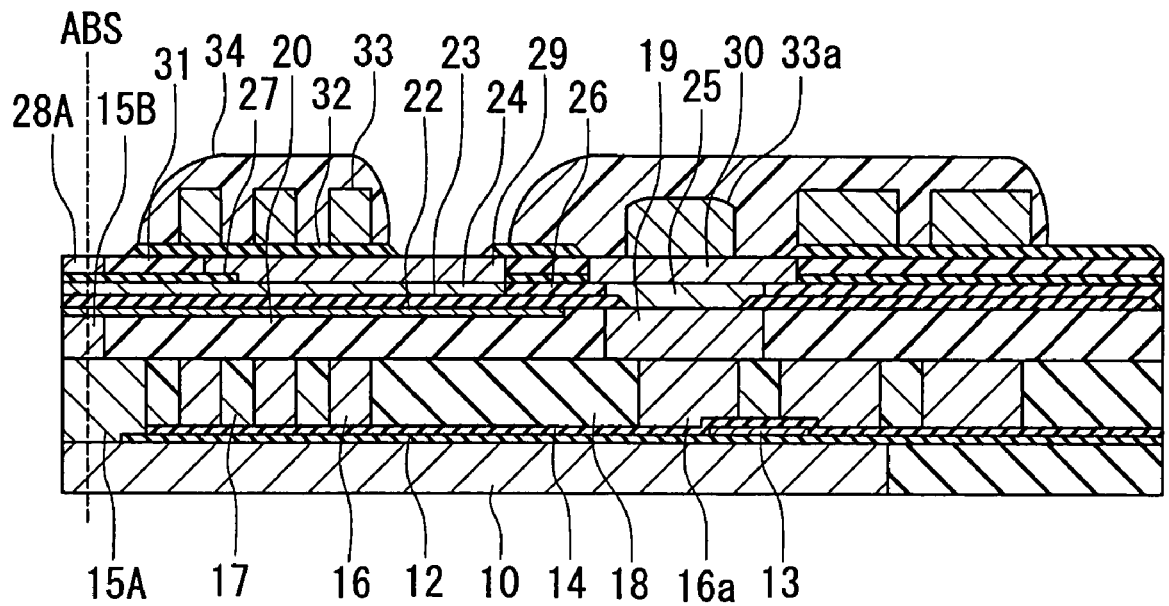
FIG. 24 is a cross-sectional view for illustrating a step that follows the step of FIG. 23.
Figure 25:
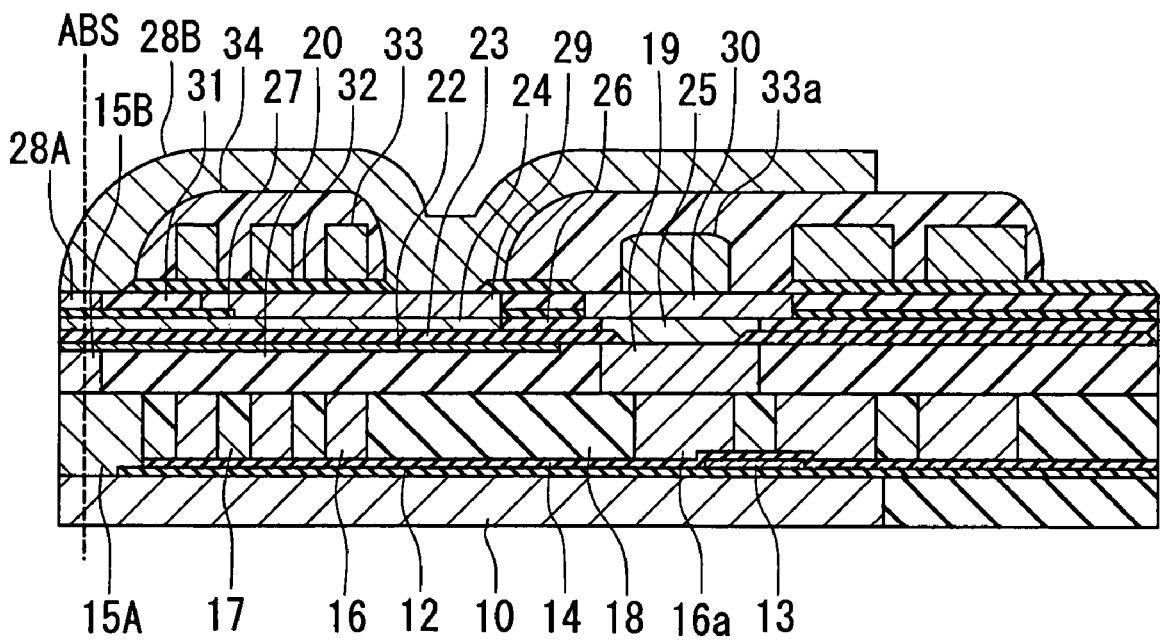
FIG. 25 is a cross-sectional view for illustrating a step that follows the step of FIG. 24.

Next, as shown in FIG. 23, the coil 33 is formed. The connecting portion 33a of the coil 33 is disposed on the connecting layer 30, and the other portion of the coil 33 is disposed on the insulating layer 32. Next, as shown in FIG. 24, the insulating layer 34 is formed to cover the coil 33. Next, as shown in FIG. 25, the second layer 28B is formed by frame plating, for example.

Next, as shown in FIG. 1, the overcoat layer 35 is formed. Next, wiring and terminals and so on are formed on the overcoat layer 35. In the embodiment, two terminals connected to the MR element 5, two terminals connected to the coils 16 and 33, and two terminals connected to the heater 13 are formed on the overcoat layer 35. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

Figure 26:
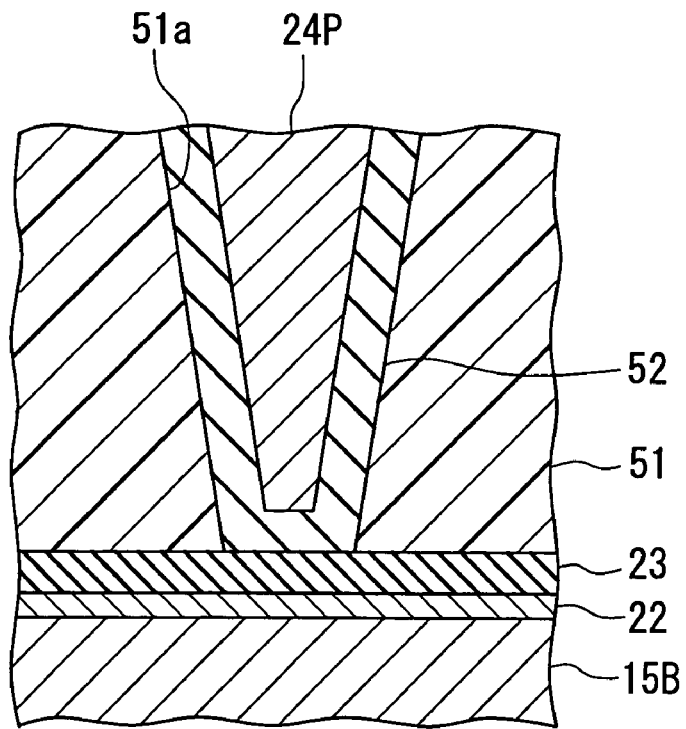
FIG. 26 is a cross-sectional view for illustrating the step of forming the pole layer of the first embodiment of the invention.

Reference is now made to FIG. 26 to describe the step of forming the pole layer 24 of the embodiment in detail. FIG. 26 is a cross-sectional view for illustrating the step of forming the pole layer 24. In the step, first, a photoresist layer is formed on the first gap layer 23. Next, the photoresist layer is patterned by photolithography to form a frame 51 having a groove 51a. Next, an insulating film 52 made of alumina, for example, is formed in the groove 51a. The insulating film 52 is formed on the top surface of the first gap layer 23 exposed at the bottom of the groove 51a and on the wall surface forming the groove 51a. The insulating film 52 is formed by, for example, a type of chemical vapor deposition (hereinafter referred to as CVD) in which formation of a single atomic layer is repeated, that is, 'atomic layer CVD' (hereinafter referred to as ALCVD). Next, although not shown, a seed layer for plating is formed on the insulating film 52. Next, the plating layer 24P that will be the pole layer 24 is formed by plating in the groove 51a of the frame 51. The frame 51 is then removed. Next, as shown in FIG. 18, the insulating layer 26 is formed, and the insulating layer 26 and the plating layer 24P are polished. The plating layer 24P becomes the pole layer 24 by being polished to have a desired thickness.

As described above, the plating layer 24P is formed after the insulating film 52 is formed in the groove 51a, so that it is possible to reduce the track width determined by the width of the track width defining portion 24A of the pole layer 24. Alternatively, the plating layer 24P may be formed in the groove 51a without forming the insulating film 52.

Figure 27:
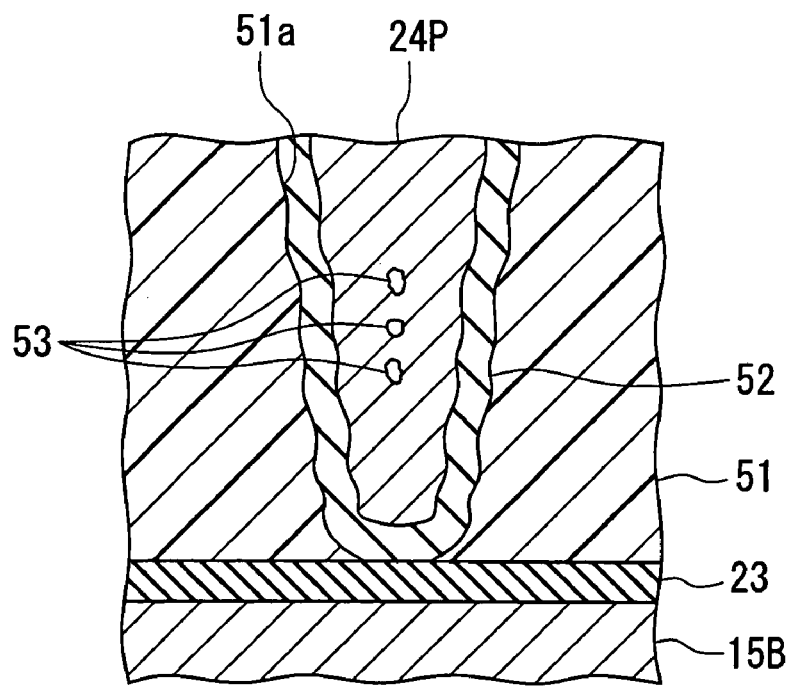
FIG. 27 is a cross-sectional view for illustrating the step of forming a pole layer of a reference example for comparison with the first embodiment of the invention.

In the embodiment, as shown in FIG. 26, the antireflection film 22 is disposed on the second layer 15B. Reference is now made to FIG. 27 to describe a case in which the antireflection film 22 is not provided as a reference example for comparison with the embodiment of the invention. FIG. 27 is a cross-sectional view for illustrating the step of forming the pole layer 24 of the reference example. In the reference example, as shown in FIG. 27, the antireflection film 22 is not provided on the second layer 15B, but the first gap layer 23 is disposed thereon. In this case, when the photoresist layer is patterned by photolithography, light used for exposing the photoresist layer passes through the photoresist layer, and then further passes through the first gap layer 23 and gets reflected off the top surface of the second layer 15B, and returns to the photoresist layer. As a result, a standing wave is generated in the photoresist layer. Consequently, the wall surface of the frame 51 forming the groove 51a will be formed into an irregular surface, not a flat surface. Since the plating layer 24P grows with a shape that reflects the shape of the wall surface of the frame 51 forming the groove 51a, if the wall surface has irregularities, there may occur a case in which the groove 51a is not completely filled with the plating layer 24P and small cavities 53 are formed in the plating layer 24P. In this case, the resulting pole layer 24 will include the small cavities 53, that is, defects. Furthermore, if the wall surface of the frame 51 forming the groove 51a has irregularities, great variations occur in width of the pole layer 24, which results in variations in track width.

In the embodiment, in contrast, the antireflection film 22 is provided on the second layer 15B, and it is thereby possible to suppress such a case that, when the photoresist layer is patterned by photolithography, light used for exposing the photoresist layer gets reflected off the top surface of the second layer 15B after passing through the photoresist layer and then returns to the photoresist layer. As a result, according to the embodiment, it is possible to suppress generation of a standing wave in the photoresist layer. Consequently, as shown in FIG. 26, the wall surface of the frame 51 forming the groove 51a has a shape closer to a flat surface than the shape of the reference example shown in FIG. 27. As a result, according to the embodiment, it is possible to form the pole layer 24 that is free from defects such as the cavities 53 and that allows the track width to be defined with accuracy.

In the embodiment, ashing may be performed on the wall surface of the frame 51 forming the groove 51a between the step of forming the frame 51 and the step of forming the plating layer 24P. This will allow the wall surface of the frame 51 forming the groove 51a to have a shape much closer to a flat surface, and the above-described effect thereby becomes more noticeable.

In the embodiment, the medium facing surface 40 is formed by lapping the surface to be the medium facing surface 40. Here, in the case in which the Vickers hardness of the antireflection film 22 is greater than that of any of the pole layer 24, the first shield 15, the second shield 28, the first gap layer 23 and the second gap layer 27, it is possible that, in the medium facing surface 40, the end face of the antireflection film 22 protrudes relative to the end face of any of the pole layer 24, the first shield 15, the second shield 28, the first gap layer 23 and the second gap layer 27 by lapping the surface to be the medium facing surface 40 and thereby forming the medium facing surface 40.

In addition to the lapping of the surface to be the medium facing surface 40 as described above, it is also possible by etching a portion of the medium facing surface 40 to implement the structure in which, in the medium facing surface 40, the end face of the antireflection film 22 protrudes relative to the end face of any of the pole layer 24, the first shield 15, the second shield 28, the first gap layer 23 and the second gap layer 27. In this case, it is not necessary that the Vickers hardness of the antireflection film 22 be greater than that of any of the pole layer 24, the first shield 15, the second shield 28, the first gap layer 23 and the second gap layer 27.

Figure 28:
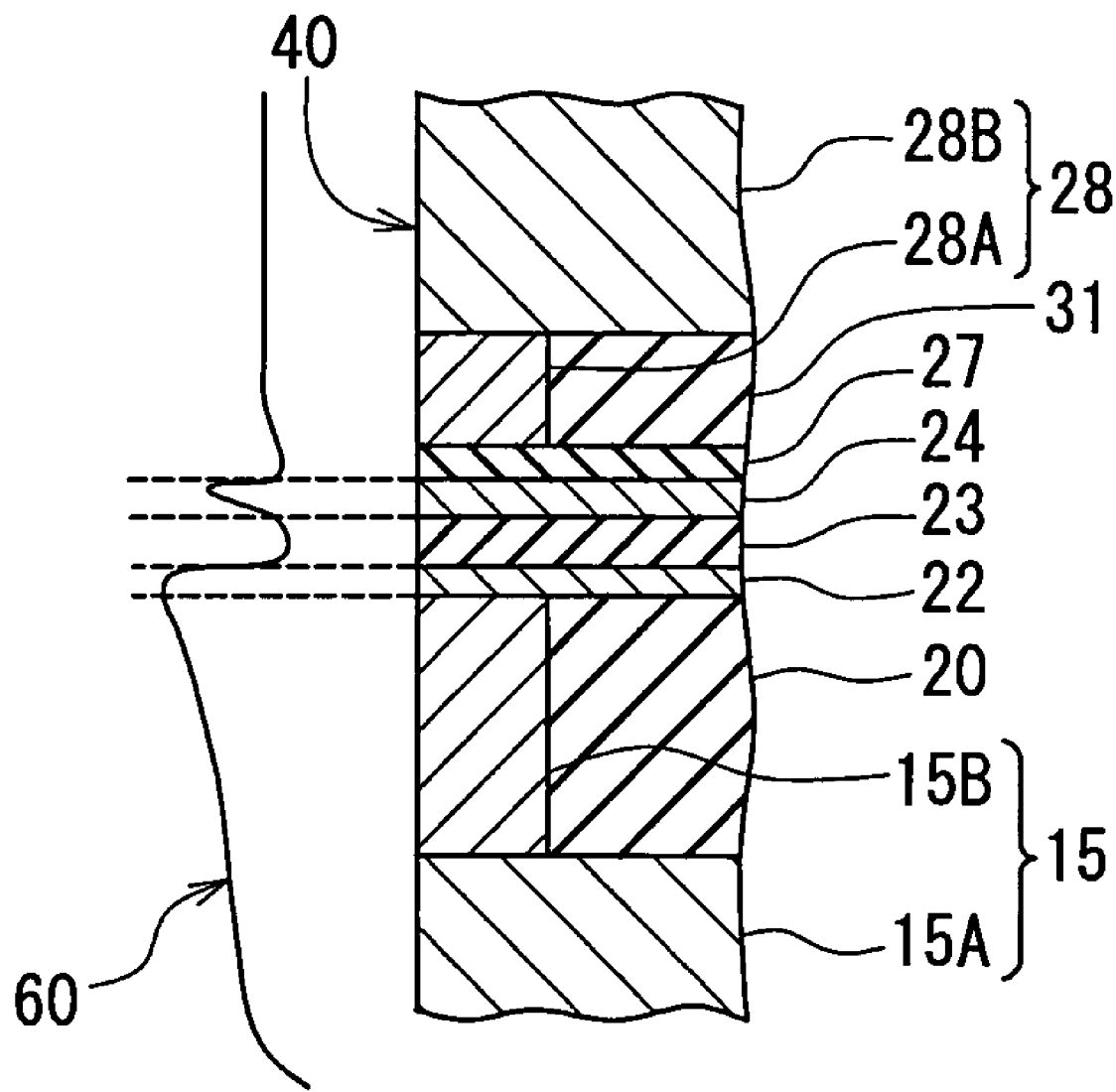
FIG. 28 is a view for illustrating irregularities of the medium facing surface of the first embodiment of the invention.

Reference is now made to FIG. 28 to describe an effect resulting from the structure in which the end face of the antireflection film 22 protrudes relative to the end face of any of the pole layer 24, the first shield 15, the second shield 28, the first gap layer 23 and the second gap layer 27 in the medium facing surface 40. FIG. 28 is a view for illustrating an example of irregularities of the medium facing surface 40 in a region from the first shield 15 to the second shield 28. In FIG. 28 the curved line with numeral 60 emphasizes the irregularities of the medium facing surface 40 in this region. This curved line indicates that, the greater the protrusion to the left, the greater is the amount of protrusion toward the recording medium. In this example, in the medium facing surface 40, the end face of the antireflection film 22 protrudes to be closer to the recording medium than the end face of any of the pole layer 24, the first shield 15, the second shield 28, the first gap layer 23 and the second gap layer 27. The difference in height of the irregularities of the medium facing surface 40 in the above-mentioned region is about 1 to 2 nm, for example.

In the case in which the end face of the antireflection film 22 protrudes to be closer to the recording medium than the end face of any of the pole layer 24, the first shield 15, the second shield 28, the first gap layer 23 and the second gap layer 27 in the medium facing surface 40 as described above, when the medium facing surface 40 touches the recording medium, the most protruding end face of the antireflection film 22 touches the recording medium and thus prevents the end face of the pole layer 24 from touching the recording medium. As a result, it is possible to prevent the pole layer 24 from being damaged.

Here is given a description of an example of a method of controlling the distance between the end face of the pole layer 24 and the recording medium through the use of the heater 13 in the case in which the end face of the antireflection film 22 protrudes to be closer to the recording medium than the end face of any of the pole layer 24, the first shield 15, the second shield 28, the first gap layer 23 and the second gap layer 27 in the medium facing surface 40 as described above. In this method, first, the end face of the antireflection film 22 is brought into contact with the recording medium. At this point, the end face of the pole layer 24 does not touch the recording medium. From this state, the value of the current fed to the heater 13 is gradually increased. As a result, the end face of the pole layer 24 gradually gets closer to the recording medium. The current value at the point when the end face of the pole layer 24 first touches the recording medium is defined as the upper limit value. By controlling the value of the current fed to the heater 13 within a range equal to or smaller than the upper limit value or a range smaller than the upper limit value when the magnetic head is actually used, it is possible to control the distance between the end face of the pole layer 24 and the recording medium while preventing the end face of the pole layer 24 from touching the recording medium.

Figure 29:
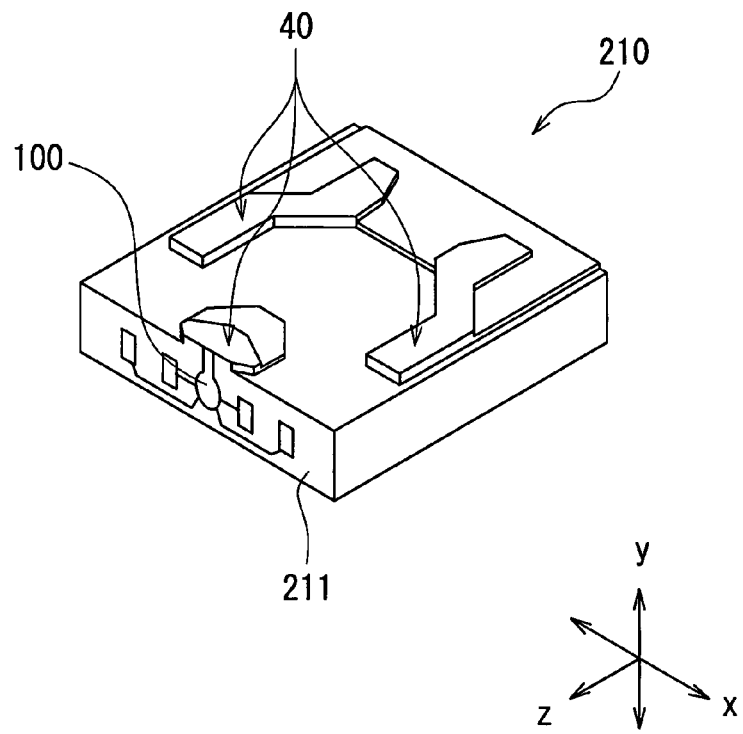
FIG. 29 is a perspective view for illustrating an example of appearance of a slider including the magnetic head of the first embodiment of the invention.

A head assembly and a magnetic disk drive of the embodiment will now be described. Reference is now made to FIG. 29 to describe a slider 210 incorporated in the head assembly. In the magnetic disk drive the slider 210 is placed to face toward a magnetic disk platter that is a circular-plate-shaped recording medium to be driven to rotate. The slider 210 has a base body 211 made up mainly of the substrate 1 and the overcoat layer 35 of FIG. 1. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 29, an airflow passes between the magnetic disk platter and the slider 210, and a lift is thereby generated below the slider 210 in the y direction of FIG. 29 and exerted on the slider 210. The slider 210 flies over the surface of the magnetic disk platter by means of the lift. The x direction of FIG. 29 is across the tracks of the magnetic disk platter. The thin-film magnetic head 100 of the embodiment is formed near the air-outflow-side end (the end located at the lower left of FIG. 29) of the slider 210.

Figure 30:
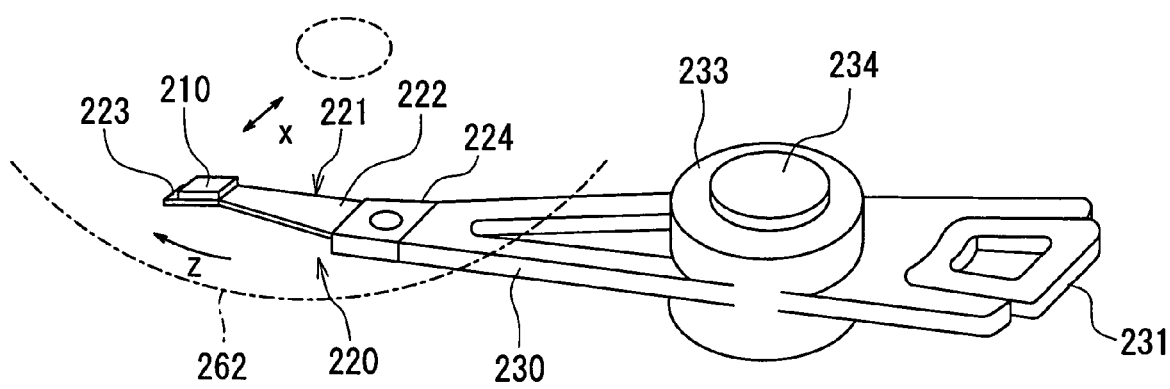
FIG. 30 is a perspective view of a head arm assembly of the first embodiment of the invention.

Reference is now made to FIG. 30 to describe the head assembly of the embodiment. The head assembly of the embodiment incorporates the slider 210 and a supporter that flexibly supports the slider 210. Modes of this head assembly include a head gimbal assembly and a head arm assembly described below.

The head gimbal assembly 220 will be first described. The head gimbal assembly 220 incorporates the slider 210 and a suspension 221 as the supporter that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly incorporating the arm 230 and the head gimbal assembly 220 attached to the arm 230 is called a head arm assembly. An assembly incorporating a carriage having a plurality of arms wherein the head gimbal assembly 220 is attached to each of the arms is called a head stack assembly.

Figure 31:
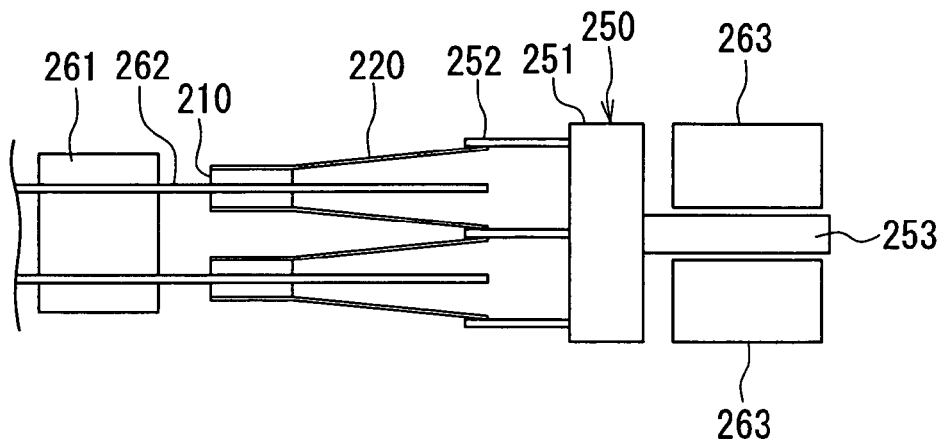
FIG. 31 is a view for illustrating a main part of a magnetic disk drive of the first embodiment of the invention.

FIG. 31 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 32:
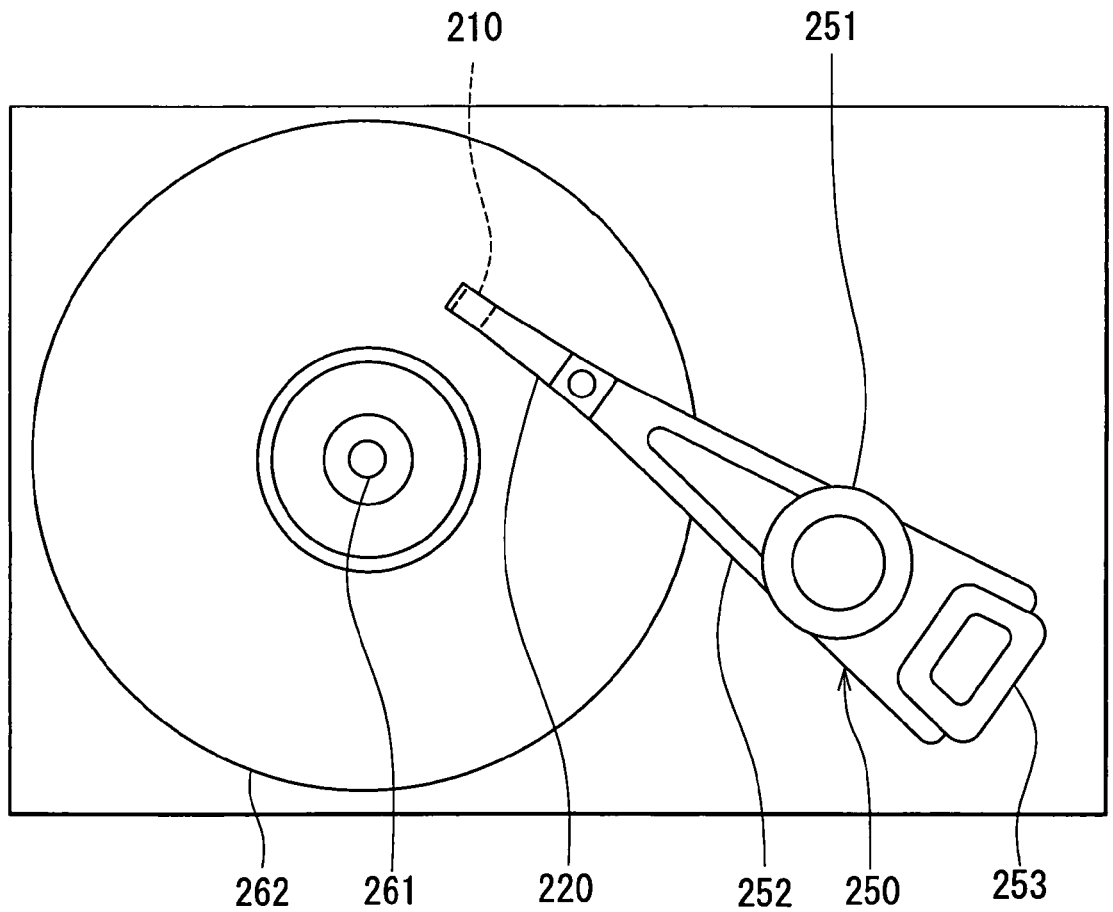
FIG. 32 is a top view of the magnetic disk drive of the first embodiment of the invention.

Reference is now made to FIG. 31 and FIG. 32 to describe an example of the head stack assembly and the magnetic disk drive of the embodiment. FIG. 31 illustrates the main part of the magnetic disk drive. FIG. 32 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the foregoing magnetic head of the embodiment.

Figure 33:
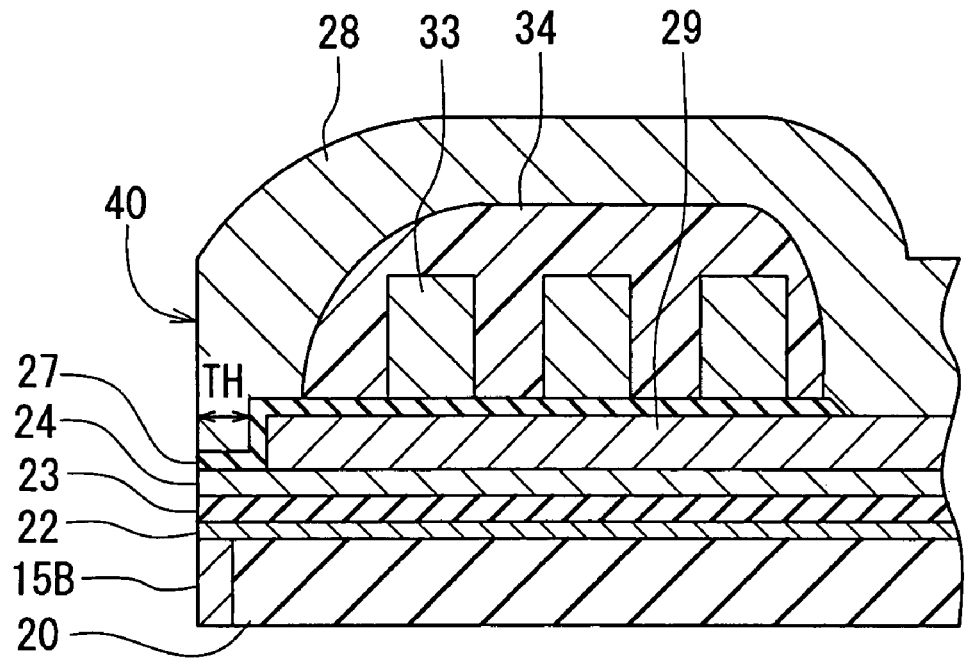
FIG. 33 is a cross-sectional view for illustrating the configuration of a magnetic head of a modification example of the first embodiment of the invention.

Reference is now made to FIG. 33 to describe a magnetic head of a modification example of the embodiment. FIG. 33 is a cross-sectional view for illustrating the configuration of the magnetic head of the modification example. In the modification example the second gap layer 27 is disposed on the pole layer 24 and the yoke layer 29. In the modification example the insulating layer 32 is not provided, and the coil 33 is disposed on a portion of the second gap layer 27 located on the yoke layer 29. In the modification example the second shield 28 is not divided into the first layer 28A and the second layer 28B, but is made up of a single layer. A portion of the second shield 28 is located between the medium facing surface 40 and the end face of the yoke layer 29 closer to the medium facing surface 40. This portion of the second shield 28 corresponds to the first layer 28A of the magnetic head of FIG. 1. This portion of the second shield 28 and the end face of the yoke layer 29 closer to the medium facing surface 40 are separated from each other by the second gap layer 27. Here, in a cross section that passes through the pole layer 24 and that is orthogonal to the medium facing surface 40 and the top surface of the substrate 1 as shown in FIG. 33, the length of the above-mentioned portion of the second shield 28 taken in the direction orthogonal to the medium facing surface 40 is called throat height TH. The size of the throat height TH has an influence on write characteristics. The remainder of configuration of the modification example is the same as that of the magnetic head of FIG. 1.

In a method of manufacturing the magnetic head of the modification example, after the pole layer 24 is formed in the step shown in FIG. 18, the yoke layer 29 is formed on the pole layer 24, and the connecting layer 30 is formed on the connecting layer 25. Next, the second gap layer 27 is formed on the entire top surface of the layered structure. Next, portions of the second gap layer 27 are etched by ion milling, for example, to thereby form in the second gap layer 27 an opening for exposing a portion of the top surface of the yoke layer 29 located near an end thereof farther from the medium facing surface 40, and an opening for exposing the top surface of the connecting layer 30. Next, the coil 33 and the insulating layer 34 are formed in this order. Next, the second shield 28 is formed. The remainder of steps of the method of manufacturing the magnetic head of the modification example are the same as those of the method of manufacturing the magnetic head of FIG. 1.

In the method of manufacturing the magnetic head of the modification example, alumina is used as the material of the second gap layer 27, and the second gap layer 27 is formed by CVD or preferably by ALCVD. Through this method, it is possible to form the second gap layer 27 that exhibits an excellent step coverage on the surface with a difference in level as shown in FIG. 33. As a result, according to this method, it is possible to prevent the yoke layer 29 and the second shield 28 from touching each other in a neighborhood of the medium facing surface 40 and to control the throat height TH with precision. It is thereby possible to achieve stable write characteristics of the write head.

Figure 34:
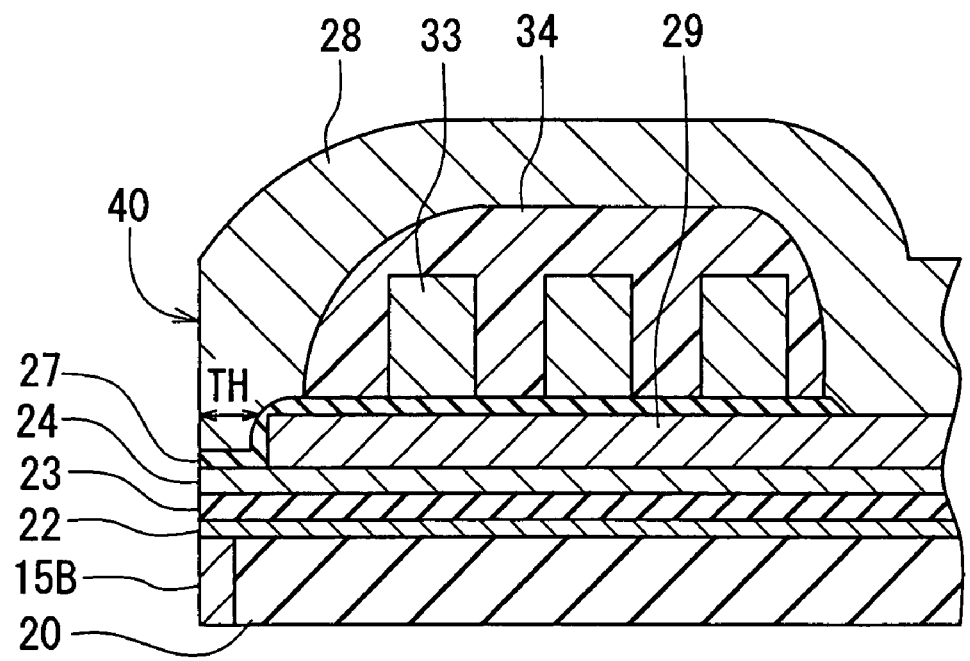
FIG. 34 is a cross-sectional view for illustrating the configuration of a magnetic head of a reference example for comparison with the magnetic head of FIG. 33.

FIG. 34 is a cross-sectional view for illustrating the configuration of a magnetic head of a reference example for comparison with the magnetic head of FIG. 33. The configuration of the magnetic head of FIG. 34 is the same as that of the magnetic head of FIG. 33 except that the second gap layer 27 is formed by sputtering. In this reference example, the step coverage of the second gap layer 27 is poor and there is a possibility that the yoke layer 29 and the second shield 28 may touch each other, and it is difficult to control the throat height TH with precision. Consequently, in the reference example, there may occur a case in which write characteristics of the write head are greatly degraded.

Second Embodiment

Figure 35:
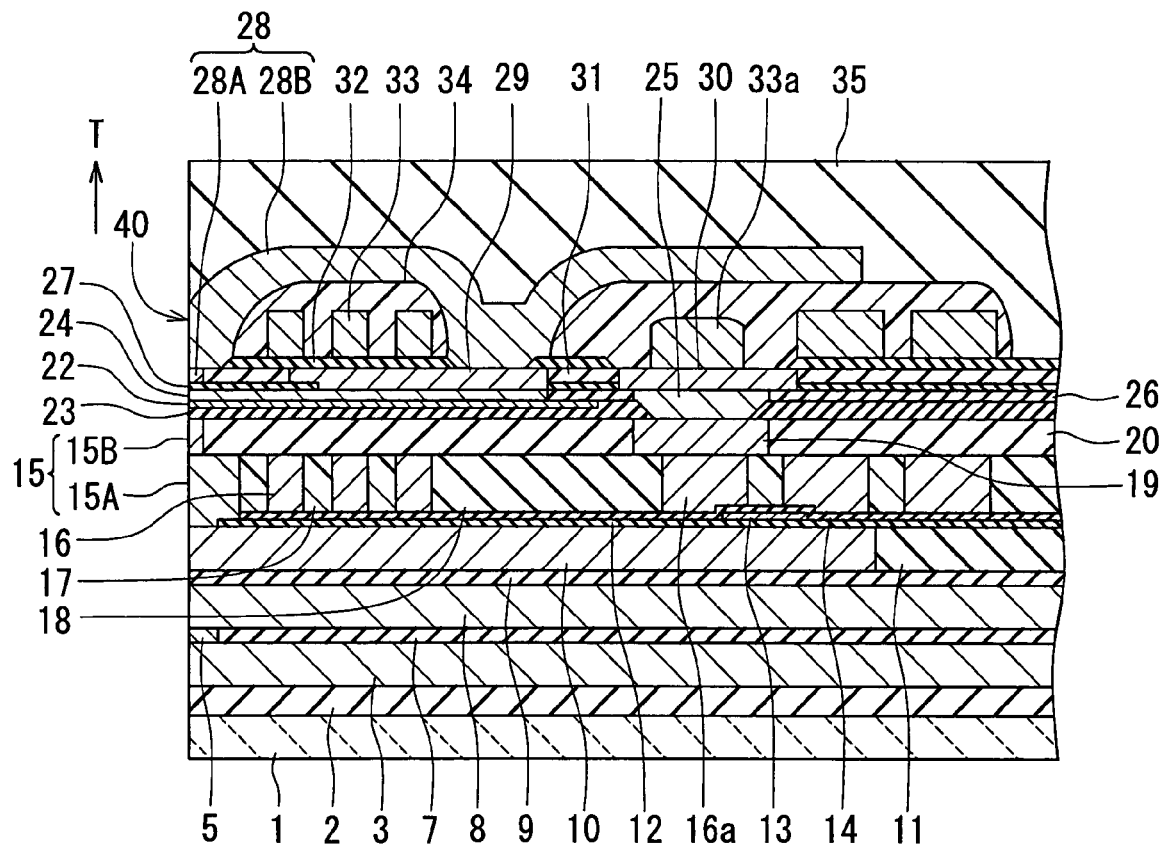
FIG. 35 is a cross-sectional view for illustrating the configuration of a magnetic head of a second embodiment of the invention.
Figure 36:
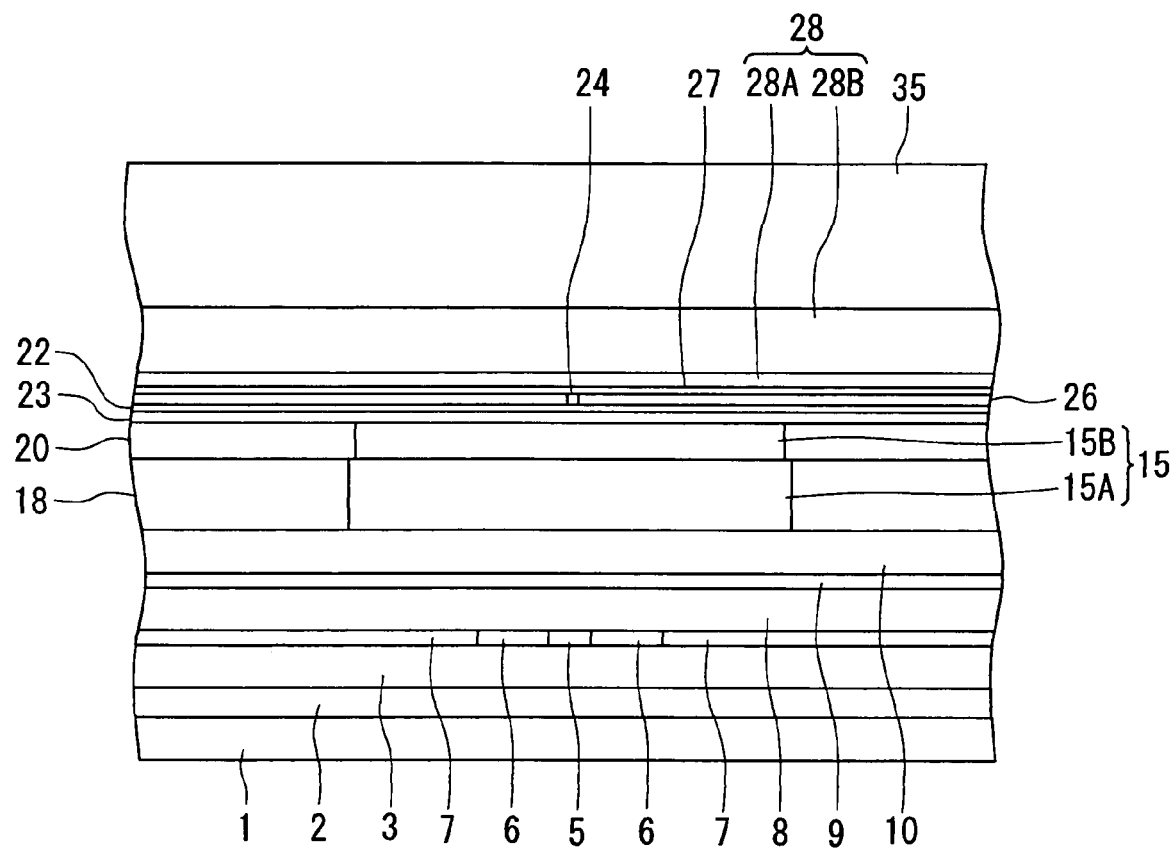
FIG. 36 is a front view of the medium facing surface of the magnetic head of the second embodiment of the invention.

Reference is now made to FIG. 35 and FIG. 36 to describe a second embodiment of the invention. FIG. 35 is a cross-sectional view for illustrating the configuration of a magnetic head of the second embodiment. FIG. 36 is a front view of the medium facing surface of the magnetic head of the second embodiment. FIG. 35 illustrates a cross section orthogonal to the medium facing surface and the top surface of the substrate. The arrow indicated with T in FIG. 35 shows the direction of travel of the recording medium.

In the magnetic head of the second embodiment, the antireflection film 22 is disposed on the first gap layer 23, that is, between the first gap layer 23 and the pole layer 24, not on the second layer 15B and the insulating layer 20.

In a method of manufacturing the magnetic head of the second embodiment, after the insulating layer 20 is formed in the step shown in FIG. 13, the first gap layer 23 is formed instead of forming the antireflection film 22. Next, through a method the same as that shown in FIG. 14 and FIG. 15, a recessed portion is formed in the top surface of the first gap layer 23, and the antireflection film 22 is formed so as to be placed in the recessed portion. The steps that follow are the same as the steps of the first embodiment illustrated in FIG. 17 and subsequent figures. In the second embodiment the antireflection film 22 may be formed on the first gap layer 23 without forming the recessed portion in the top surface of the first gap layer 23.

As does the first embodiment, the second embodiment makes it possible to suppress such a case that, when the photoresist layer is patterned by photolithography in the step of forming the pole layer 24, light used for exposing the photoresist layer gets reflected off the top surface of the second layer 15B after passing through the photoresist layer, and then returns to the photoresist layer.

The remainder of configuration, operation and effects of the second embodiment are similar to those of the first embodiment.

The present invention is not limited to the foregoing embodiments but may be practiced in still other ways. For example, while the magnetic head disclosed in the embodiments has such a configuration that the read head is formed on the base body and the write head is stacked on the read head, it is also possible that the read head is stacked on the write head.

Obviously many modifications and variations of the present invention are possible in the light of the above teachings. It is therefore to be understood that within the scope of equivalence of the appended claims the invention may be practiced otherwise than as specifically described.

What is claimed is:

1. A magnetic head for perpendicular magnetic recording comprising:
  a medium facing surface that faces toward a recording medium;
  a coil that generates a magnetic field corresponding to data to be written on the recording medium;
  a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
  a magnetic layer disposed backward of the pole layer along a direction of travel of the recording medium;
  a first shield made of a magnetic material and having an end face located in the medium facing surface at a position backward of the end face of the pole layer along the direction of travel of the recording medium, the first shield being disposed between the magnetic layer and the pole layer and being in contact with the magnetic layer;
  a first gap layer made of a nonmagnetic material and having an end face located in the medium facing surface, the first gap layer being disposed between the first shield and the pole layer;
  a second shield made of a magnetic material and having an end face located in the medium facing surface at a position forward of the end face of the pole layer along the direction of travel of the recording medium;
  a second gap layer made of a nonmagnetic material and having an end face located in the medium facing surface, the second gap layer being disposed between the second shield and the pole layer; and
  a substrate on which the coil, the pole layer, the magnetic layer, the first and second shields, and the first and second gap layers are stacked, wherein
  the first shield is located closer to the substrate than is the second shield,
  a portion of the coil is present between the magnetic layer and the pole layer,
  the magnetic head further comprises an antireflection film having an end face located in the medium facing surface, the antireflection film being disposed between the first shield and the first gap layer or between the first gap layer and the pole layer, and
  a surface of the antireflection film facing toward the pole layer and defined by a first peripheral edge and a second peripheral edge of the antireflection film in a track width direction is flat and is located closer to the pole layer than is a surface of the portion of the coil facing toward the pole layer.

2. The magnetic head for perpendicular magnetic recording according to claim 1, wherein the antireflection film has a Vickers hardness greater than that of any of the pole layer, the first and second shields, and the first and second gap layers.

3. The magnetic head for perpendicular magnetic recording according to claim 1, wherein, in the medium facing surface, the end face of the antireflection film protrudes relative to the end face of any of the pole layer, the first and second shields, and the first and second gap layers.

4. The magnetic head for perpendicular magnetic recording according to claim 1, wherein the antireflection film is made of SiC.

5. The magnetic head for perpendicular magnetic recording according to claim 1, further comprising a heater for controlling a distance between the end face of the pole layer and the recording medium.

6. A head assembly comprising: a slider including a magnetic head for perpendicular magnetic recording and disposed to face toward a recording medium; and a supporter flexibly supporting the slider, wherein:
  the magnetic head comprises:
  a medium facing surface that faces toward a recording medium;
  a coil that generates a magnetic field corresponding to data to be written on the recording medium;
  a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;
  a magnetic layer disposed backward of the pole layer along a direction of travel of the recording medium;
  a first shield made of a magnetic material and having an end face located in the medium facing surface at a position backward of the end face of the pole layer along the direction of travel of the recording medium, the first shield being disposed between the magnetic layer and the pole layer and being in contact with the magnetic layer;
  a first gap layer made of a nonmagnetic material and having an end face located in the medium facing surface, the first gap layer being disposed between the first shield and the pole layer;
  a second shield made of a magnetic material and having an end face located in the medium facing surface at a position forward of the end face of the pole layer along the direction of travel of the recording medium;
  a second gap layer made of a nonmagnetic material and having an end face located in the medium facing surface, the second gap layer being disposed between the second shield and the pole layer; and
  a substrate on which the coil, the pole layer, the magnetic layer, the first and second shields, and the first and second gap layers are stacked, wherein the first shield is located closer to the substrate than is the second sheild, a portion of the coil is present between the magnetic layer and the pole layer, the magnetic head further comprises an antireflection film having an end face located in the medium facing surface, the antireflection film being disposed between the first shield and the first gap layer or between the first gap layer and the pole layer, and a surface of the antireflection film facing toward the pole layer and defined by a first peripheral edge and a second peripheral edge of the antireflection film in a track width direction is flat and is located closer to the pole layer than is a surface of the portion of the coil facing toward the pole layer.

7. A magnetic disk drive comprising: a slider including a magnetic head for perpendicular magnetic recording and disposed to face toward a recording medium that is driven to rotate; and an alignment device supporting the slider and aligning the slider with respect to the recording medium, wherein:

the magnetic head comprises:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a magnetic layer disposed backward of the pole layer along a direction of travel of the recording medium;

a first shield made of a magnetic material and having an end face located in the medium facing surface at a position backward of the end face of the pole layer along the direction of travel of the recording medium, the first shield being disposed between the magnetic layer and the pole layer and being in contact with the magnetic layer;

a first gap layer made of a nonmagnetic material and having an end face located in the medium facing surface, the first gap layer being disposed between the first shield and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, wherein the first shield is located closer to the substrate than is the second shield, a portion of the coil is present between the magnetic layer and the pole layer, the magnetic head further comprises an antireflection film having an end face located in the medium facing surface, the antireflection film being disposed between the first shield and the first gap layer or between the first gap layer and the pole layer, and a surface of the antireflection film facing toward the pole layer and defined by a first peripheral edge and a second peripheral edge of the antireflection film in a track width direction is flat and is located closer to the pole layer than is a surface of the portion of the coil facing toward the pole layer.

8. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a magnetic layer disposed backward of the pole layer along a direction of travel of the recording medium;

a first shield made of a magnetic material and having an end face located in the medium facing surface at a position backward of the end face of the pole layer along the direction of travel of the recording medium, the first shield being disposed between the magnetic layer and the pole layer and being in contact with the magnetic layer;

a first gap layer made of a nonmagnetic material and having an end face located in the medium facing surface, the first gap layer being disposed between the first shield and the pole layer;

a second shield made of a magnetic material and having an end face located in the medium facing surface at a position forward of the end face of the pole layer along the direction of travel of the recording medium;

a second gap layer made of a nonmagnetic material and having an end face located in the medium facing surface, the second gap layer being disposed between the second shield and the pole layer; and a substrate on which the coil, the pole layer, the magnetic layer, the first and second shields, and the first and second gap layers are stacked, wherein the first shield is located closer to the substrate than is the second shield, a portion of the coil is present between the magnetic layer and the pole layer, the magnetic head further comprises an antireflection film having an end face located in the medium facing surface, the antireflection film being disposed between the first shield and the first gap layer or between the first gap layer and the pole layer, and a surface of the antireflection film facing toward the pole layer and defined by a first peripheral edge and a second peripheral edge of the antireflection film in a track width direction is flat and is located closer to the pole layer than is a surface of the portion of the coil facing toward the pole layer, the method comprising the steps of:

forming the magnetic layer;

forming the first shield after the magnetic layer is formed;

forming the first gap layer after the first shield is formed;

forming the pole layer after the first gap layer is formed;

forming the second gap layer after the pole layer is formed;

forming the second shield after the second gap layer is formed;

forming the coil; and forming the antireflection film between the step of forming the first shield and the step of forming the pole layer, wherein the step of forming the pole layer includes the steps of:

forming a photoresist layer;

forming a frame having a groove by patterning the photoresist layer through photolithography; and forming a plating layer that will be the pole layer in the groove of the frame by plating.

9. The method of manufacturing a magnetic head for perpendicular magnetic recording according to claim 8, wherein the antireflection film has a Vickers hardness greater than that of any of the pole layer, the first and second shields, and the first and second gap layers.

10. The method of manufacturing a magnetic head for perpendicular magnetic recording according to claim 8, further comprising the step of forming the medium facing surface such that, in the medium facing surface, the end face of the antireflection film protrudes relative to the end face of any of the pole layer, the first and second shields, and the first and second gap layers.

11. The method of manufacturing a magnetic head for perpendicular magnetic recording according to claim 8, wherein the antireflection film is made of SiC.

12. The method of manufacturing a magnetic head for perpendicular magnetic recording according to claim 8, wherein the step of forming the pole layer further includes the step of performing ashing on a wall surface of the frame forming the groove between the step of forming the frame and the step of forming the plating layer.

13. The method of manufacturing a magnetic head for perpendicular magnetic recording according to claim 8, further comprising the step of forming a heater for controlling a distance between the end face of the pole layer and the recording medium.

* * * * *